(12) United States Patent
Takamiya et al.

(10) Patent No.: US 7,689,111 B2
(45) Date of Patent: Mar. 30, 2010

(54) OPTICAL APPARATUS

(75) Inventors: Makoto Takamiya, Tokyo (JP); Ichiro Onuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 716 days.

(21) Appl. No.: 11/555,365

(22) Filed: Nov. 1, 2006

(65) Prior Publication Data

US 2007/0103754 A1     May 10, 2007

(30) Foreign Application Priority Data

Nov. 7, 2005   (JP)   ............................. 2005-321809
Jun. 6, 2006   (JP)   ............................. 2006-157122

(51) Int. Cl.
*G02B 7/28* (2006.01)
*G02B 26/08* (2006.01)

(52) U.S. Cl. .................................... 396/111; 359/196.1

(58) Field of Classification Search ................. 396/111; 250/201.6, 201.7, 201.8
See application file for complete search history.

(56) References Cited

U.S. PATENT DOCUMENTS

| 5,701,005 | A | * | 12/1997 | Meyers | ....................... 250/226 |
|---|---|---|---|---|---|
| 6,035,133 | A | * | 3/2000 | Shiomi | ......................... 396/55 |
| 6,574,437 | B2 | * | 6/2003 | Sensui | ......................... 396/81 |
| 6,768,867 | B2 | * | 7/2004 | Kindaichi et al. | ........... 396/100 |
| 6,933,978 | B1 | * | 8/2005 | Suda | .......................... 348/345 |
| 2003/0039030 | A1 | * | 2/2003 | Myers | ......................... 359/449 |
| 2005/0147403 | A1 | * | 7/2005 | Ohmura | ....................... 396/114 |

\* cited by examiner

*Primary Examiner*—W. B. Perkey
*Assistant Examiner*—Dennis Hancock
(74) *Attorney, Agent, or Firm*—Cowen, Liebowitz & Latman, P.C.

(57) ABSTRACT

An optical apparatus is disclosed which can reliably form AF images and split the AF images to provide excellent focus detection performance in the phase difference detection method. The optical apparatus comprises a light deflection unit including a deflection optical member. The deflection optical member deflects at least one of a first luminous flux and a second luminous flux relative to the other, the first and second luminous fluxes passing through a first area and a second area in the exit pupil of an optical system, respectively, and forming images on a photoelectrical conversion element. The light deflection unit comprises a light-limiting member which limits an image-forming area where at least one of the first and second luminous fluxes emerging from the light deflection unit forms the image on the photoelectrical conversion element.

2 Claims, 23 Drawing Sheets

446a

EXPRESSION FOR CALCULATING TRANSMISSION ANGLE

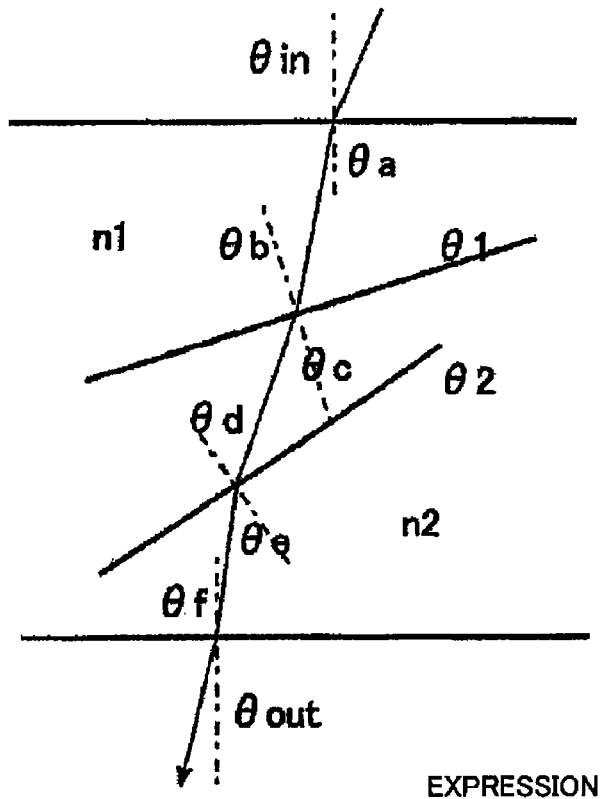

$\sin\theta\, in = n1 * \sin\theta\, a$ $\theta\, b = \theta\, a + \theta\, 1$ $n1 * \sin\theta\, b = \sin\theta\, c$ $\theta\, d = \theta\, c + (\theta\, 2 - \theta\, 1)$ $\sin\theta\, d = n2 * \sin\theta\, e$ $\theta\, f = \theta\, e - \theta\, 2$ $n2 * \sin\theta\, f = \sin\theta\, out$

EXPRESSION FOR CALCULATING TRANSMITTANCE

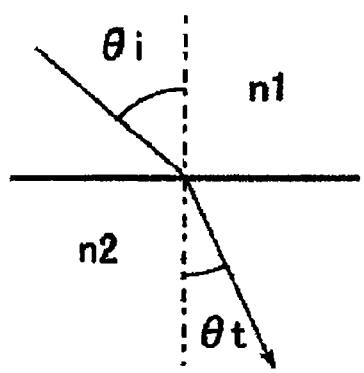

$rp = \tan(\theta\, i - \theta\, t)/\tan(\theta\, i - \theta\, t)$ $= \dfrac{n2 * \cos\theta\, i - n1 * \cos\theta\, t}{n2 * \cos\theta\, i + n1 * \cos\theta\, t}$ $rs = \sin(\theta\, i - \theta\, t)/\sin(\theta\, i - \theta\, t)$ $= \dfrac{n1 * \cos\theta\, i - n2 * \cos\theta\, t}{n1 * \cos\theta\, i + n0 * \cos\theta\, t}$ $Rp = rp\char`^2 \qquad ,Rs = rs\char`^2$
$Tp = 1 - rp\char`^2 \qquad ,Ts = 1 - rs\char`^2$

FIG. 4

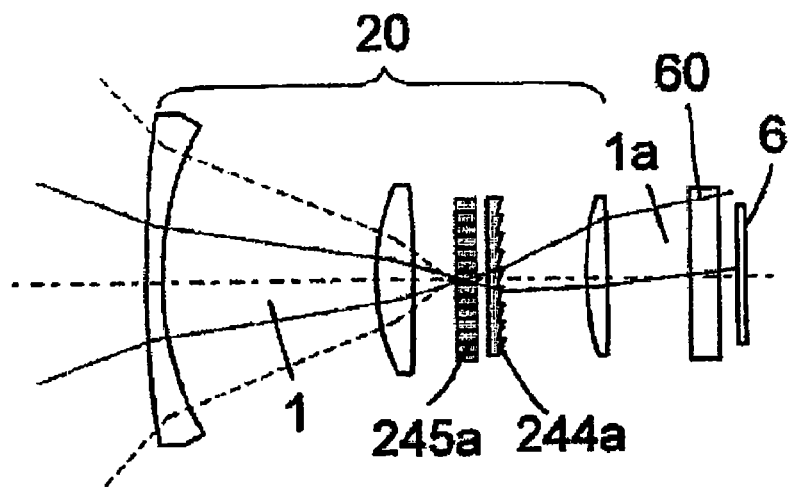
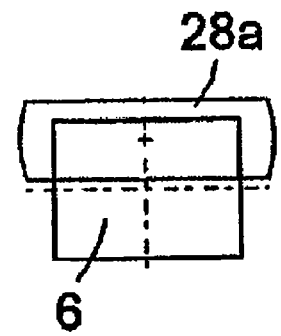
FIG. 12A  FIG. 12B
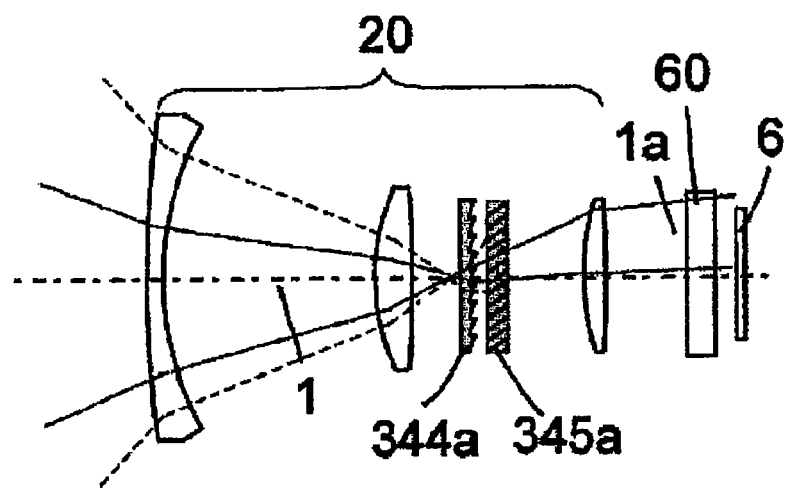
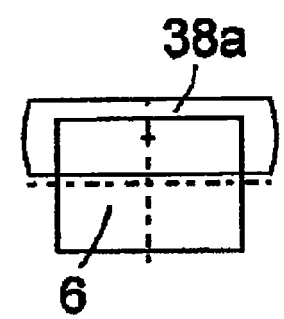
FIG. 13A  FIG. 13B

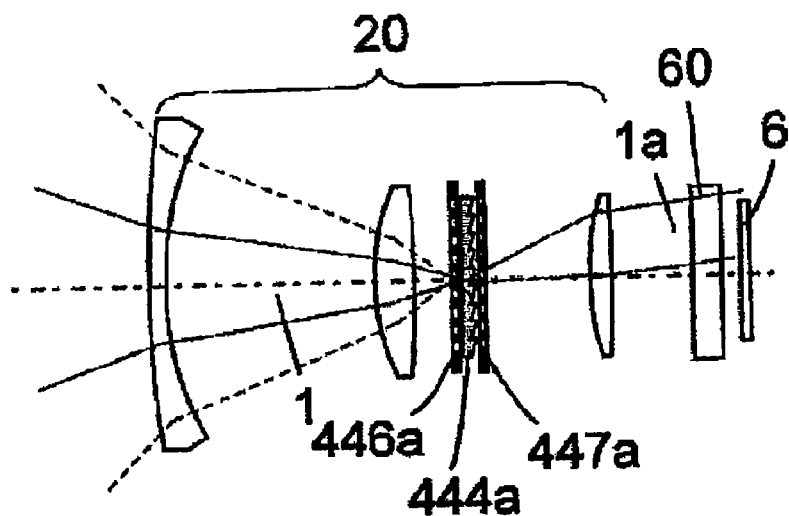 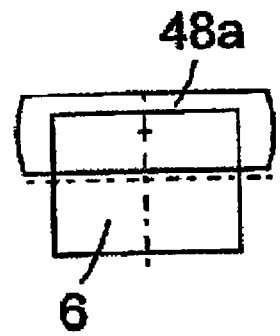
FIG. 14A   FIG. 14B
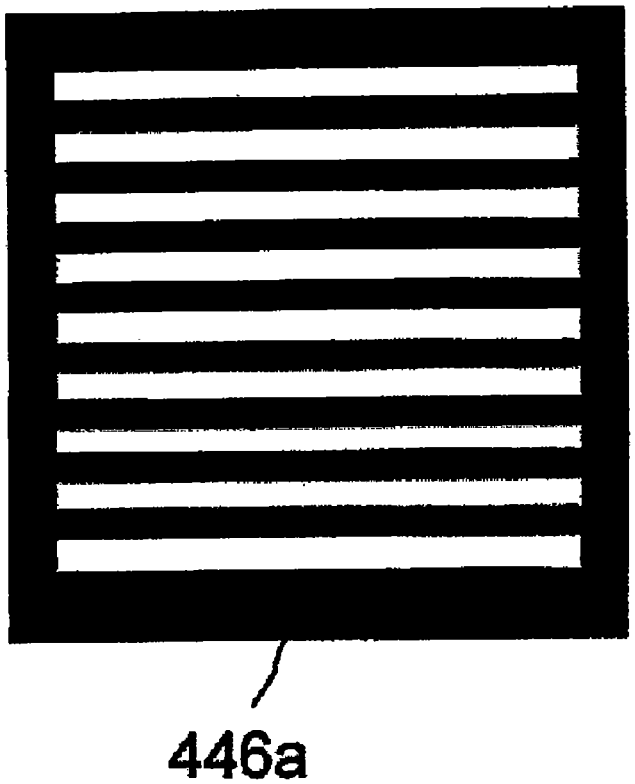 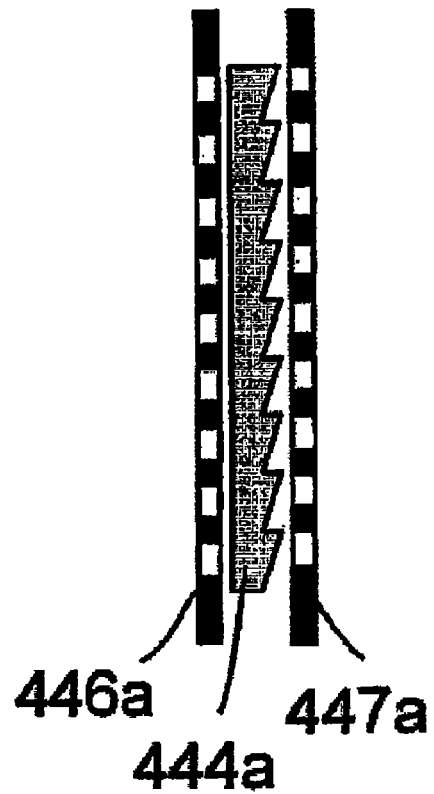
FIG. 15A   FIG. 15B

OPTICAL APPARATUS

BACKGROUND OF THE INVENTION

The present invention relates to an optical apparatus which forms a plurality of images on a photoelectrical conversion element to perform focus detection in a phase difference detection method.

In single-lens reflex cameras, AF (auto-focus) in a TTL (Through the Taking Lens) phase difference detection method is generally employed. In the phase difference detection method, a luminous flux from an object is taken through an image-pickup lens and then reflected by a movable mirror and directed onto a surface (a first image-forming surface) equivalent to a light-receiving surface of a film or an image-pickup element. The luminous flux directed to the equivalent surface is split into two (pupil splitting) by a secondary image-forming optical system including a separator lens, and the two light components are directed to a pair of line sensors for AF. The difference between the two images (phase difference) on the pair of line sensors is detected to determine the amount of displacement of a focus lens in the image-pickup lens from the in-focus position.

A digital camera has an image-pickup element serving as a photoelectrical conversion element for photoelectrically converting an object image. When part of the image-pickup element is used as a sensor area for AF, it is not necessary to provide a line sensor dedicated to AF or a secondary image-forming optical system other than the image-pickup lens.

Thus, a focus detection system has been proposed in which part of an image-pickup element is used as a sensor area for AF, and two luminous fluxes separated by a split image prism included in an image-pickup optical system are directed to that area (Japanese Patent Laid-Open No. 2004-46132).

Another proposed structure includes a holographic optical element disposed closer to an object than a first image-forming surface to realize AF in the TTL phase difference detection method (Japanese Patent Laid-Open No. H04(1992)-147207).

In the method proposed in Japanese Patent Laid-Open No. 2004-46132 in which the split image prism is used, however, continuity of an image is essential on the border in the split image prism in contrast to the TTL phase difference detection method. For example, if the shape of image on the border in the split image prism is not a straight line, an out-of-focus state is determined even when an in-focus state is achieved. Such a constraint in focus detection makes it impossible to realize the same level of focus detection performance as that in the TTL phase difference detection method.

The method proposed in Japanese Patent Laid-Open No. H04(1992)-147207 in which the holographic optical element is used is similar to the TTL phase difference detection method in principle. However, the holographic optical element with large chromatic dispersion is used to form two images (AF images) in a direction of pupil splitting that are important in determining a focus state. Thus, wavelengths greatly affect a difference between incident angles of images having a phase difference that is important to providing high accuracy of focus detection. As a result, the method is not suitable for practical use when focus detection is performed.

BRIEF SUMMARY OF THE INVENTION

It is an object of the present invention to provide an optical apparatus which can reliably form AF images and split the AF images to provide excellent focus detection performance in the phase difference detection method.

According to an aspect, the present invention provides an optical apparatus which has a light deflection unit including a deflection optical member. The deflection optical member deflects at least one of a first luminous flux and a second luminous flux relative to the other, the first and second luminous fluxes passing through a first area and a second area in the exit pupil of an optical system, respectively, and forming images on a photoelectrical conversion element. The light deflection unit has a light-limiting member which limits an image-forming area where at least one of the first and second luminous fluxes emerging from the light deflection unit forms the image on the photoelectrical conversion element.

According to another aspect, the present invention provides an optical apparatus which comprises a light deflection unit including a deflection optical member. The deflection optical member deflects at least one of a first luminous flux and a second luminous flux relative to the other, the first and second luminous fluxes passing through a first area and a second area in the exit pupil of an optical system, respectively, and forming images on a photoelectrical conversion element. The light deflection unit has a light-limiting member which limits an image-forming area where at least one of the first and second luminous fluxes emerging from the light deflection unit forms the image on the photoelectrical conversion element. The light-limiting member has a first surface formed of a curved surface having an optical power and a second surface having a blazed shape element formed thereon.

Other objects and features of the present invention will become apparent from the following preferred embodiments described with reference to the drawings.

BRIEF DESCRIPTION OF THE DRAWINGS

FIG. 4 shows expressions for calculating a transmission angle and transmittance in two opposite prism sheets.

FIG. 12A is a sectional side view showing the structure of an optical apparatus which is Embodiment 3 of the present invention, and FIG. 12B is a front view showing an image circle in Embodiment 3.

FIG. 13A is a sectional side view showing the structure of an optical apparatus which is Embodiment 4 of the present invention, and FIG. 13B is a front view showing an image circle in Embodiment 4.

FIG. 14A is a sectional side view showing the structure of an optical apparatus which is Embodiment 5 of the present invention, and FIG. 14B is a front view showing an image circle in Embodiment 5.

FIGS. 15A and 15B are schematic diagrams showing a mask element used in Embodiment 5.

DETAILED DESCRIPTION OF THE PREFERRED EMBODIMENTS

Preferred embodiments of the present invention will hereinafter be described with reference to the drawings.

First, an optical apparatus previously proposed by the present inventor will be described in brief with reference to FIGS. 28A, 28B and 29A to 29C. The optical apparatus is appropriately used for focus detection in the TTL phase difference detection method and is capable of reducing the substantial effect of wavelengths upon a difference between incident angles of AF images. The optical apparatus serves as the premise of the present invention. FIGS. 28A, 28B and 29A to 29C show a digital camera with an interchangeable lens.

Figures 28A, 28B:
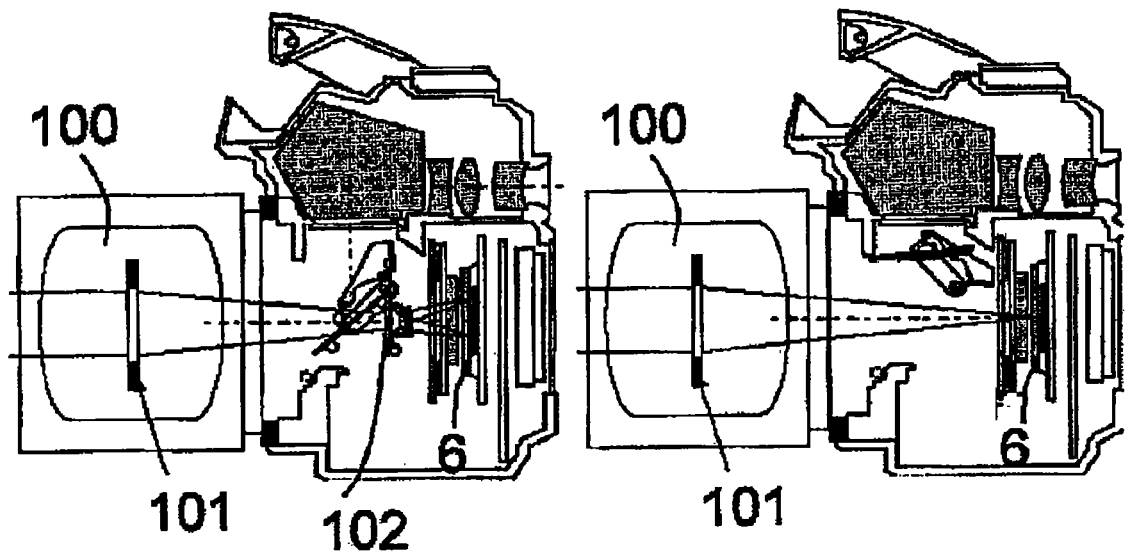
FIGS. 28A and 28B are sectional side views showing the structure of an optical apparatus which serves as the premise of the present invention.

In FIGS. 28A and 28B, a deflection optical element 102 is provided between an optical system 100 and an image-pickup element 6. The deflection optical element 102 has a function of deflecting a first luminous flux and a second luminous flux which pass through a first area and a second area in the exit pupil of the optical system 100, respectively, and then reach the image-pickup element 6, such that they travel in directions (upward and downward directions in FIG. 28) different from the splitting directions in the first and second areas.

The apertures of an aperture stop 101 and the deflection optical element 102 are set to have small sizes such that an AF image formed in an upper portion of the image-pickup element 6 is not overlapped with an AF image formed in a lower portion thereof. In this case, the AF images tend to be darker than the brightness of the object.

Figures 29A, 29B, 29C:
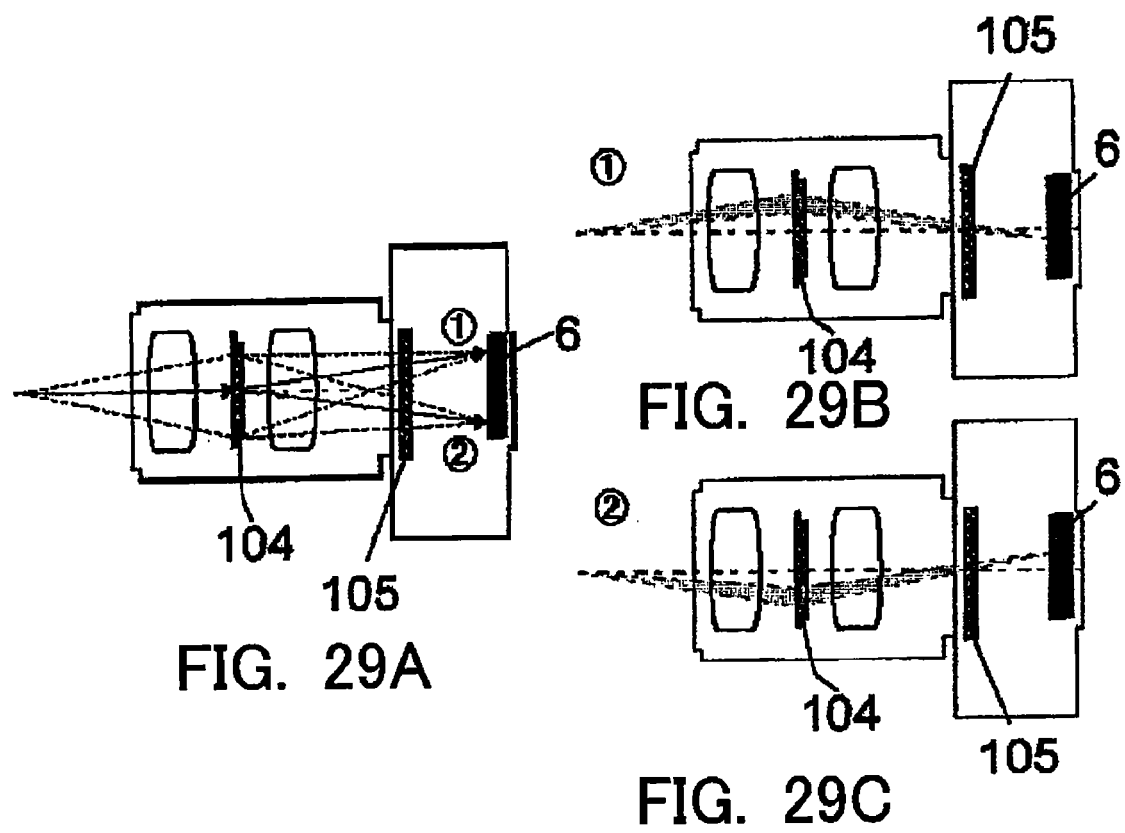
FIGS. 29A, 29B, and 29C are sectional side views showing the structure of an optical apparatus which serves as the premise of the present invention.

On the other hand, FIGS. 29A to 29C show a deflection optical element 104 disposed close to the pupil position of an optical system. A mask member 105 is placed at a position different from the position of the deflection optical element 104 to prevent an upper AF image and a lower AF image from overlapping with each other. In this case, it is necessary to provide a mechanism for moving the mask member 105 into and out of an optical path together with the separately provided deflection optical element 104 when an image is taken and focus is detected.

Embodiments hereinafter described are provided for improving the optical apparatus shown in FIGS. 28A, 28B and 29A to 29C.

Embodiment 1

Figure 1A:
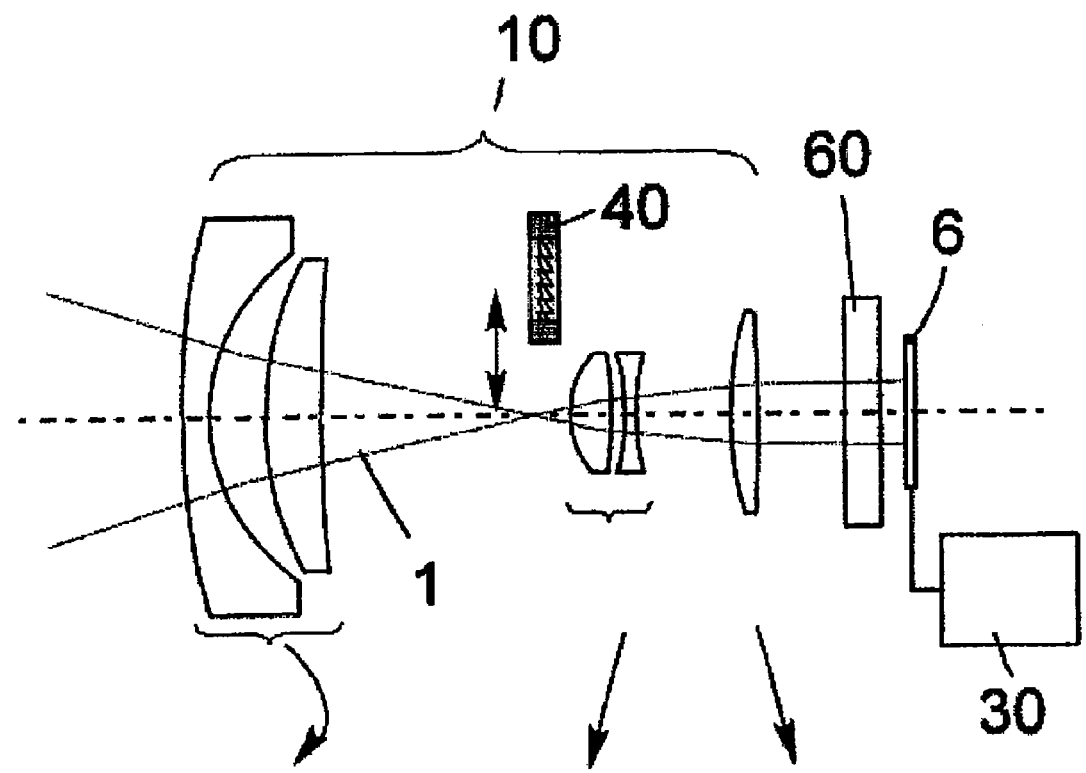
FIGS. 1A and 1B are sectional side views showing the structure of an optical apparatus which is Embodiment 1 of the present invention.
Figure 1B:
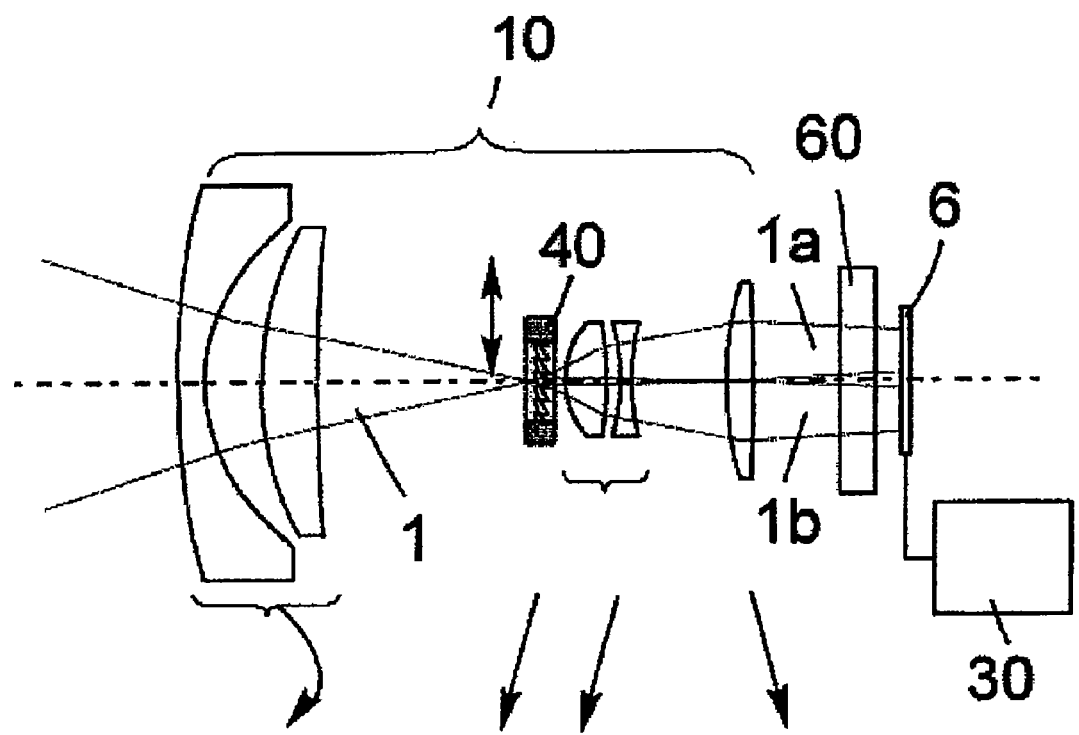

FIGS. 1A and 1B show the structure of an optical apparatus which is Embodiment 1 of the present invention. FIG. 1A shows the optical apparatus of Embodiment 1 when it picks up an image. FIG. 1B shows the optical apparatus of Embodiment 1 when it performs AF. Embodiment 1 is described in conjunction with a digital camera integral with a lens serving as an image-pickup apparatus. This applies to Embodiments 2 to 7 later described.

In FIGS. 1A and 1B, reference numeral 10 shows an image-pickup optical system which is formed of a so-called three-lens-unit zoom lens. Movable lenses can be moved as indicated by arrows shown under the optical system along an optical axis (shown by a dash dotted line in FIGS. 1A and 1B, and this applies to other figures) to change the interval between the lens surfaces, thereby changing a focal length between the wide-angle end and the telephoto end. This applies to other embodiments later described.

Reference numeral 60 shows an optical low-pass filter (LPF) which mainly has a function of reducing a phenomenon such as false color and moire seen in digital cameras. Reference numeral 6 shows an image-pickup element serving as a photoelectrical conversion element for photoelectrically converting an object image formed by the image-pickup optical system 10. An image signal is produced on the basis of an output from the image-pickup element 6 and is recorded on a recording medium such as a semiconductor memory, an optical disk, and a magnetic tape, not shown.

Reference numeral 40 shows a light deflection unit which is movable into and out of inner space on the optical path of the image-pickup optical system 10, specifically, space between a first lens and a second lens. The space corresponds to the position of the exit pupil of the image-pickup optical system 10 or the position adjacent to the exit pupil. The light deflection unit 40 is movable in the optical axis direction together with the second lens in zooming. The detailed structure of the light deflection unit 40 will be described later.

Reference numeral 30 shows a controller which determines a focus state (a defocus amount) and a drive amount of a focus lens for achieving focus in AF.

Reference numeral 1 shows a luminous flux entering the image-pickup optical system 10 (only a luminous flux passing through the center of the pupil of the image-pickup optical system 10 is shown in FIGS. 1A and 1B).

Figure 2:
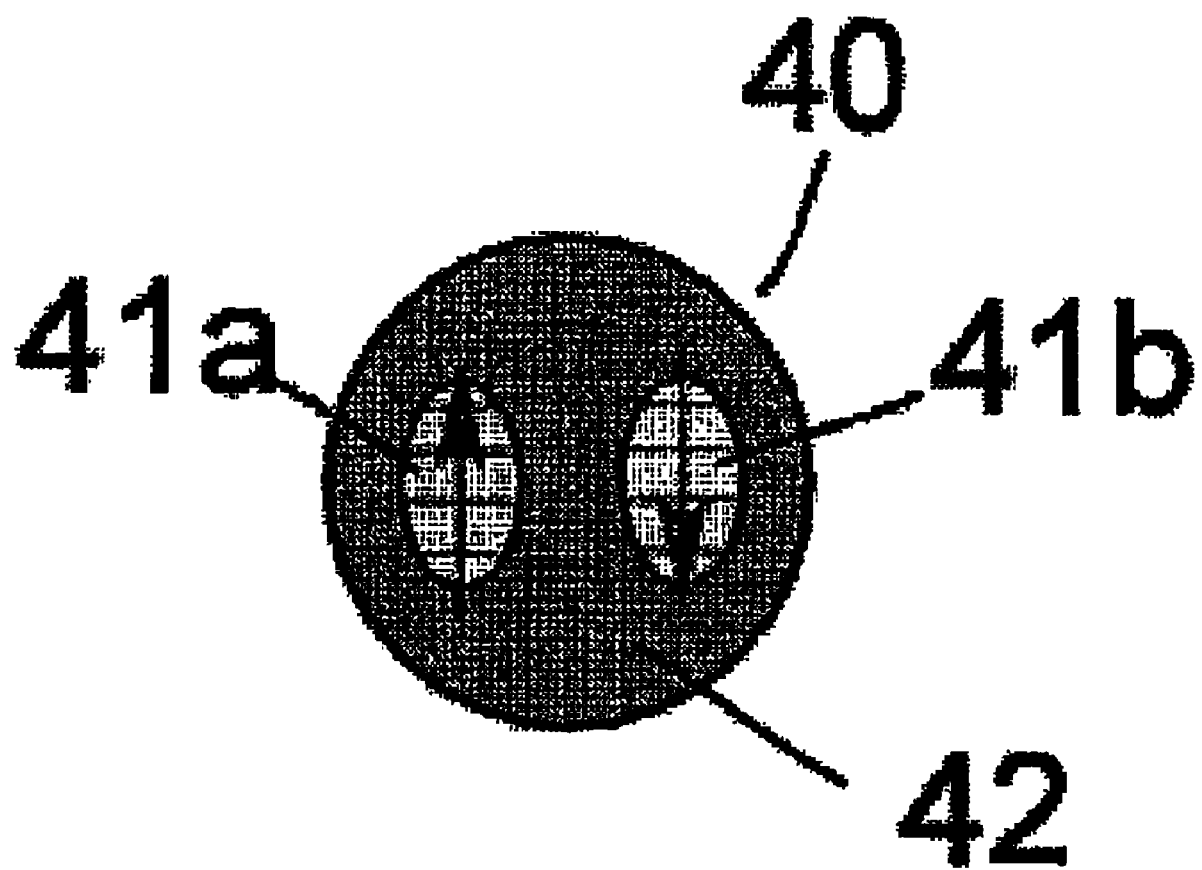
FIG. 2 is a schematic diagram showing a light deflection unit used in Embodiment 1.

FIG. 2 shows the light deflection unit 40 viewed from the front of the image-pickup optical system 10. The light deflection unit 40 has two pupils (a first area and a second area) 41a and 41b separated by a light-shielding mask 42. A deflection optical element (or a deflection optical member) which deflects a luminous flux and a light-limiting element (or a light-limiting member) which limits the incident angle of the luminous flux on the deflection optical element are provided at each of the split pupils 41a and 41b. The specific structures of these elements will be described later.

The deflection optical elements provided at the split pupils 41a and 41b have the functions of deflecting luminous fluxes in directions indicated by arrows in FIG. 2, that is, in opposite directions. The deflection directions are different from the pupil splitting direction, and specifically, substantially orthogonal to the pupil splitting direction.

As shown in FIG. 1B, a luminous flux (first luminous flux) 1a passing through the split pupil 41a forms an AF image (hereinafter also referred to an image A) on an upper portion of the image-pickup element 6. A luminous flux (second luminous flux) 1b passing through the split pupil 41b forms an AF image (hereinafter also referred to an image B) on a lower portion of the image-pickup element 6.

Figure 3A:
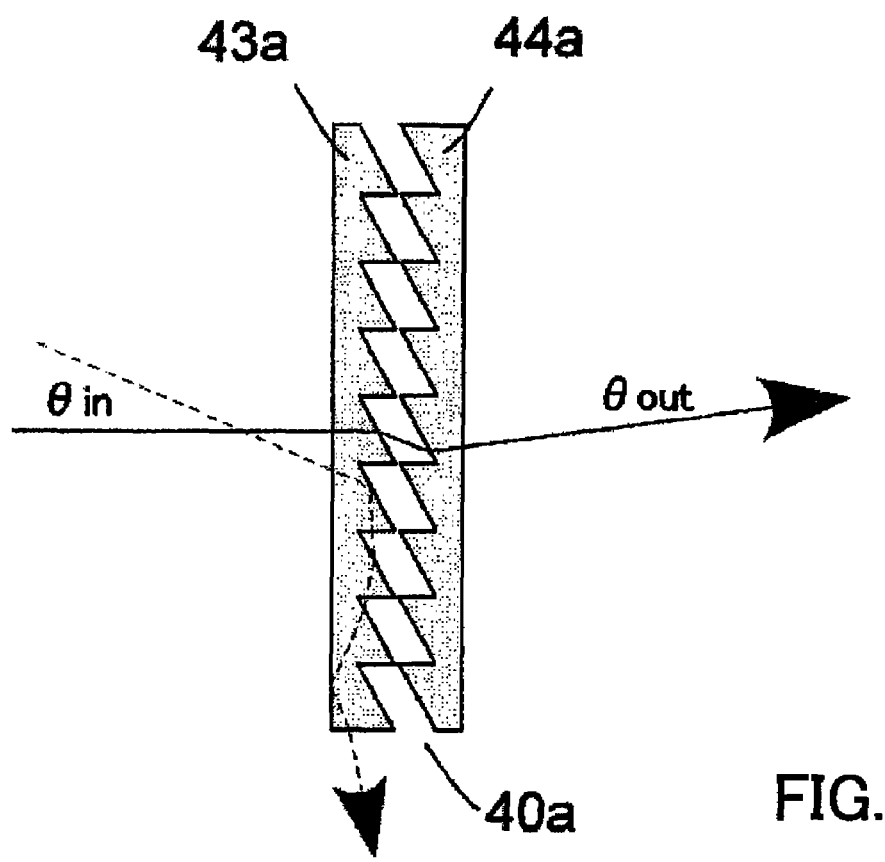
FIGS. 3A and 3B are sectional side views showing the structure of split pupils of the light deflection unit having a function of limiting a luminous flux angle used in Embodiment 1.

The structure of the light deflection unit 40 is now described in more detail. FIG. 3A shows a light deflection unit 40a formed of a deflection optical element 44a which is disposed at the split pupil 41a of the light deflection unit 40 shown in FIG. 2 and a light-limiting element 43a which limits the incident angle of a luminous flux on the deflection optical element 44a. In Embodiment 1, the effect of the light-limiting element 43a is combined with the effect of the deflection optical element 44a to provide the effect of deflecting the luminous flux, and in that sense, the light-limiting element 43a also serves as a deflection optical element. However, to facilitate the description, the elements 43a and 44a are referred to as the light-limiting element and the deflection optical element, respectively.

The light-limiting element 43a is formed of a prism sheet having a blazed shape of periodically formed prisms and is disposed such that its surface having the prisms formed thereon faces the deflection optical element 44a. The function of the light-limiting element 43a to limit the incident angle of the luminous flux on the deflection optical element 44a is realized by totally reflecting light rays of the incident luminous flux at an angle which satisfies the total reflection condition with respect to oblique surfaces of the prisms and not transmitting those light rays toward the deflection optical element 44a.

Light rays with an angle with respect to the oblique surface of the prism of the light-limiting element 43a that do not satisfy the total reflection condition are transmitted through the light-limiting element 43a and enter the deflection optical element 44a. The deflection optical element 44a is also formed of a prism sheet having a blazed shape of periodically formed prisms and is disposed such that the surface having the prisms formed thereon faces the surface of the light-limiting element 43 on which the prisms are formed. A solid line in FIG. 3A shows the locus of a representative light ray passing through the light deflection unit 40a. A broken line in FIG. 3A shows the locus of a representative light ray blocked by the light deflection unit 40a.

Adjusting the combined deflection effects of the light-limiting element 43a and the deflection optical element 44a enables to set an angle of the luminous flux emerging from the light deflection unit 40a (deflection optical element 44a) to a desirable angle. The function of the light-limiting element 43a to limit the incident angle of the luminous flux (luminous flux angle) on the deflection optical element 44a consequently can limit the area of the AF image formed on the image-pickup element 6 by the luminous flux emerging from the light deflection unit 40a (deflection optical element 44a).

Thus, the mask member 105 as shown in FIGS. 29A to 29B is not required outside the image-pickup optical system (at the front of the image-pickup element 6). In addition, the light deflection unit 40 placed inside the image-pickup optical system 10 allows an increase in the size of the split pupils 41a and 41b (deflection optical elements 44a and 44b) which are areas for transmitting the luminous fluxes forming the AF images on the image-pickup element 6. This can lead to brighter AF images as compared with the case where the deflection optical element 102 is provided in front of the image-pickup element 6 as shown in FIG. 28A.

FIG. 4 shows the relationship between the incident angle and the exit angle with respect to two opposite prism sheets corresponding to the light-limiting element 43a and the deflection optical element 44a. In FIG. 4, an expression for calculating a transmission angle is provided for calculating the exit angle (deflection angle) of a light ray incident on the one of the prism sheets and then emerging from the other. An expression for calculating transmittance is provided for calculating the transmittances of a P-wave and an S-wave on an interface between media having refractive indexes n1 and n2. These expressions can be used to perform calculation for each of the angles of the oblique surfaces of the prisms of the two prism sheets to determine the deflection angle with respect to the incident angle and the transmitted light amount.

Figure 5:
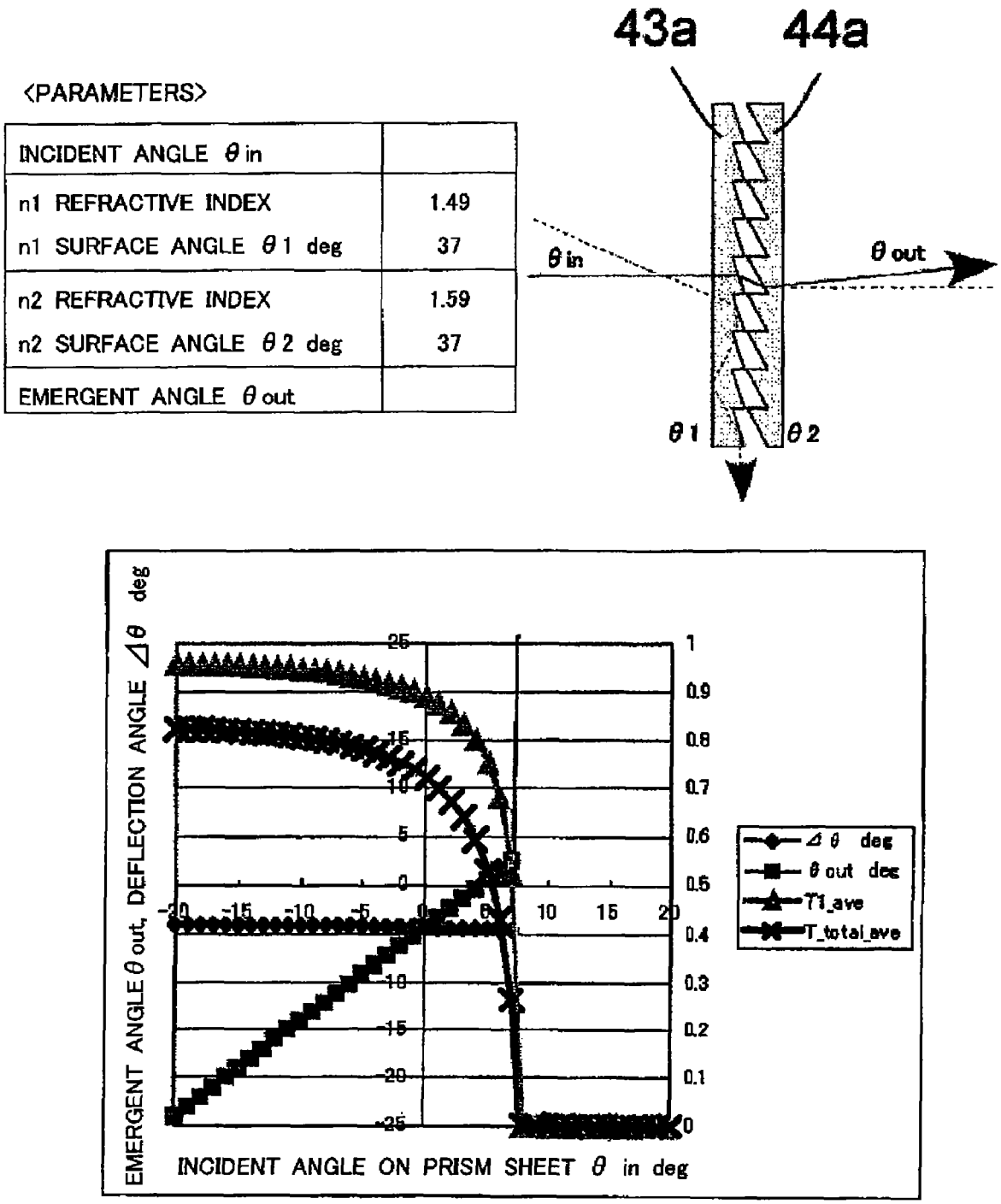
FIG. 5 shows numeric examples in Embodiment 1.

FIG. 5 shows the calculation results of the parameters of the two prism sheets, which are the light-limiting element 43a and the deflection optical element 44a, with a deflection angle of approximately 4.5 degrees and a limited incident angle of approximately 10 degrees. The transmittance represents the average value for the P-wave and S-wave. Angles θ1 and θ2 of the oblique surfaces of the prisms of the light-limiting element 43a and the deflection optical element 44a are set to 37 degrees. The light-limiting element 43a is made of acrylic resin and the deflection optical element 44a is made of a different material, that is, polycarbonate material, so that they are different only in refractive indexes n1 and n2. This advantageously improves the imaging performance resulting from the combined deflection effects and allows the shapes of molds for prisms to be same.

Since the actual luminous flux forming each image height has a width in a direction perpendicular to the sheet of FIG. 5 and an angle in a vertical direction in FIG. 5, the actual limited incident angle is smaller than the angle shown in FIG. 5.

Figure 3B:
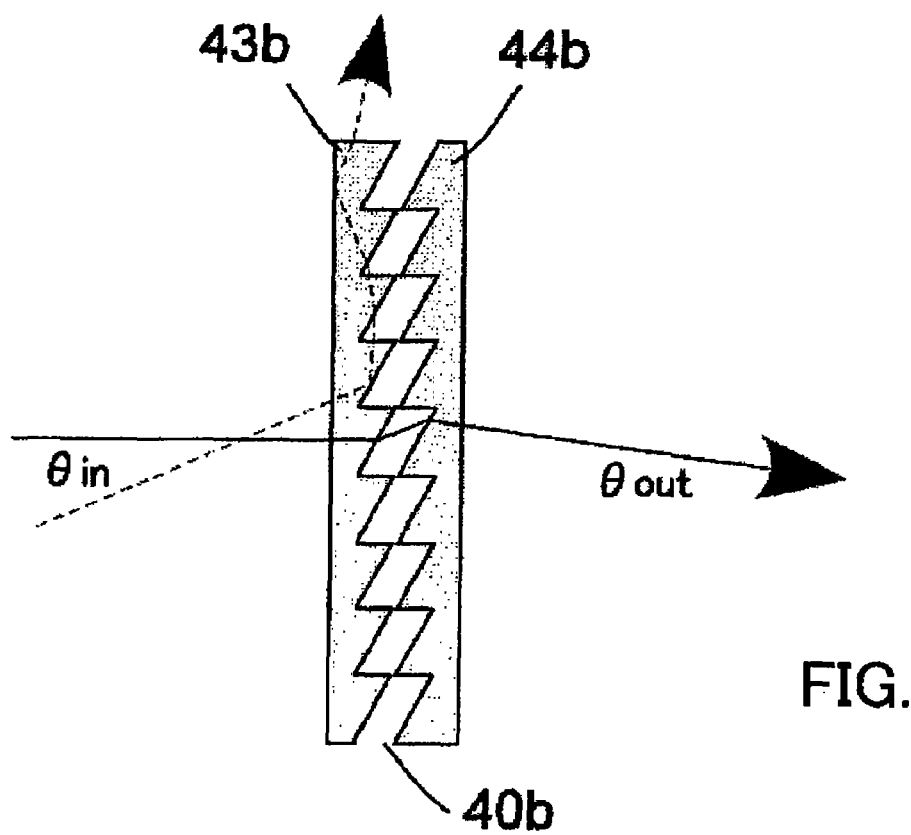

The light-limiting element 43a and the deflection optical element 44a as described above are disposed at the split pupil 41a in the light deflection unit 40 of Embodiment 1. On the other hand, as shown in FIG. 3B, a light-limiting element 43b and a deflection optical element 44b are disposed at the split pupil 41b, which have the same shapes as those of the light-limiting element 43a and the deflection optical element 44a and their blazed directions are opposite to those of the light-limiting element 43a and the deflection optical element 44a, respectively. In other words, the elements 43b and 44b provided by rotating the light-limiting element 43a and the deflection optical element 44a by 180 degrees on the surface of the light deflection unit 40 are disposed at the split pupil 41b.

Thus, as shown in FIGS. 1B and 2, the luminous fluxes passing through the split pupils 41a and 41b can be deflected in the opposite directions.

Figure 6A:
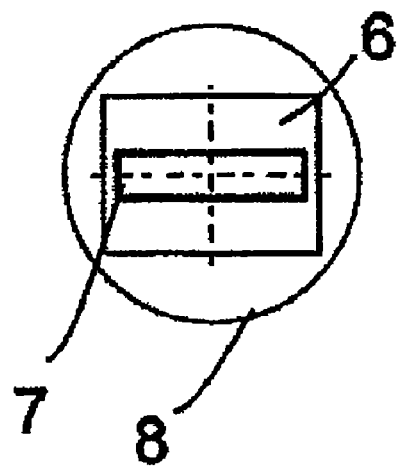
FIGS. 6A and 6B are diagrams for explaining image circles and AF image detection areas in Embodiment 1.
Figure 6B:
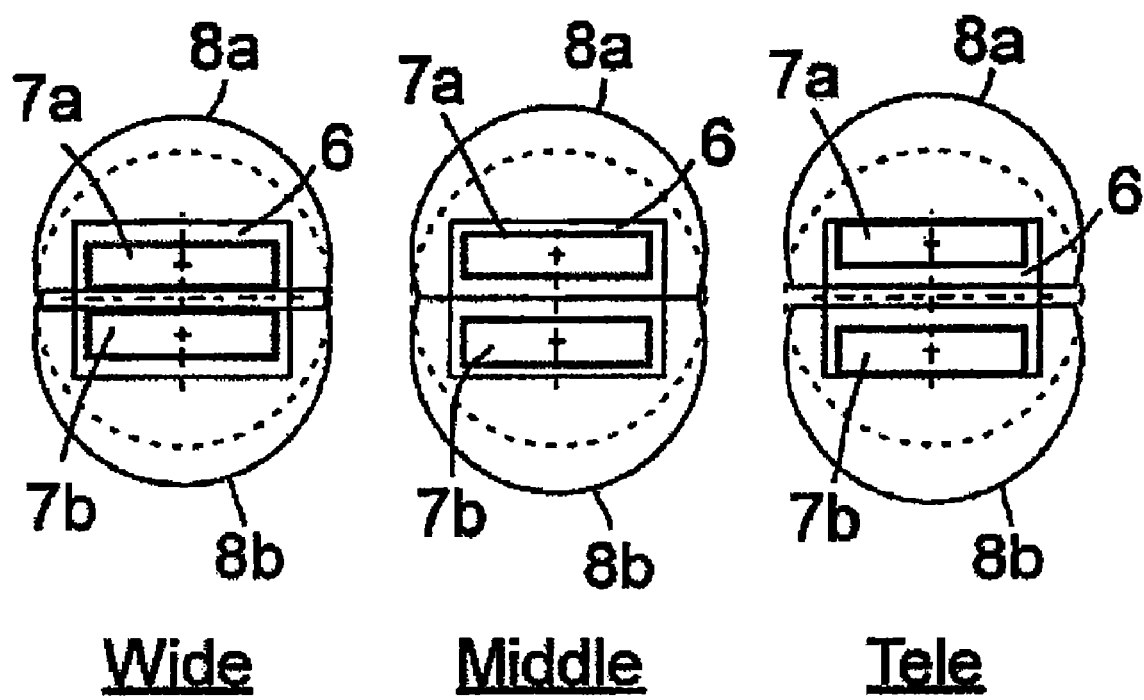

FIG. 6A shows an image circle 8 and an AF image detection area 7 on the image-pickup element 6 when the apparatus picks up an image and the light deflection unit 40 is not inserted into the optical path as shown in FIG. 1A. FIG. 6B shows image circles 8a and 8b and AF image detection areas 7a and 7b for two AF images at the wide-angle end, middle, and telephoto end when the apparatus performs AF and the light deflection unit 40 is inserted into the optical path as shown in FIG. 1B.

As shown in FIG. 6B, the image circle (area for forming the image A) 8*a* formed by the luminous flux passing through the split pupil 41*a* has a shape with a lower portion removed by the function of the light-limiting element 43*a* to limit the luminous flux angle. The combined deflection effects of the light-limiting element 43*a* and the deflection optical element 44*a* incline the luminous flux passing through the split pupil 41*a* to move the image circle 8*a* to an upper portion of the image-pickup element 6.

On the other hand, the image circle (area for forming the image B) 8*b* formed by the luminous flux passing through the split pupil 41*b* has a shape with an upper portion removed by the function of the light-limiting element 43*b* to limit the luminous flux angle. The combined deflection effects of the light-limiting element 43*b* and the deflection optical element 44*b* incline the luminous flux passing through the split pupil 41*b* to move the image circle 8*b* to a lower portion of the image-pickup element 6. Adjusting the limited incident angle and the luminous flux deflection angle of the light deflection unit 40 enables to form the images A and B with no overlap in the AF image detection areas 7*a* and 7*b* on the image-pickup element 6.

Changing the zoom position as shown in FIG. 6B moves the central positions of the image A and image B vertically. The limited incident angle and the luminous flux deflection angle are adjusted to prevent the images A and B from overlapping in the AF image detection areas 7*a* and 7*b* at any zoom position.

When the image-pickup optical system 10 is designed such that the angle of a light ray remains substantially the same for the image height at the position where the light deflection unit 40 is disposed regardless of the zoom position, the vertical changes of the focus detection areas as shown in FIG. 6B can be eliminated. This allows an increase in the size of the AF image detection area.

When the central positions of the image A and image B on the image-pickup element 6 are changed vertically depending on the zoom position as in Embodiment 1, the vertical offset can be determined by calculation. In other words, the addresses of the image A and image B on the image-pickup element 6 can be calculated on the basis of the information on the zoom position. The controller 30 performs the calculation and also serves as a focus detection means for detecting (calculating) the focus state of the image-pickup optical system 10 by using an output signal from the image-pickup element 6. In addition, the controller 30 controls the drive of the focus lens (focus adjustment control) included in the image-pickup optical system 10 based on the detection result.

As described above, with the use of the light deflection unit 40 of Embodiment 1, the image A and the image B are deflected upward and downward, respectively, while an overlap of the images A and B is avoided in the AF image detection areas 7*a* and 7*b* on the image-pickup element 6. This can result in favorable phase difference AF images formed simultaneously in the two different areas on the image-pickup element 6.

Figure 7A:
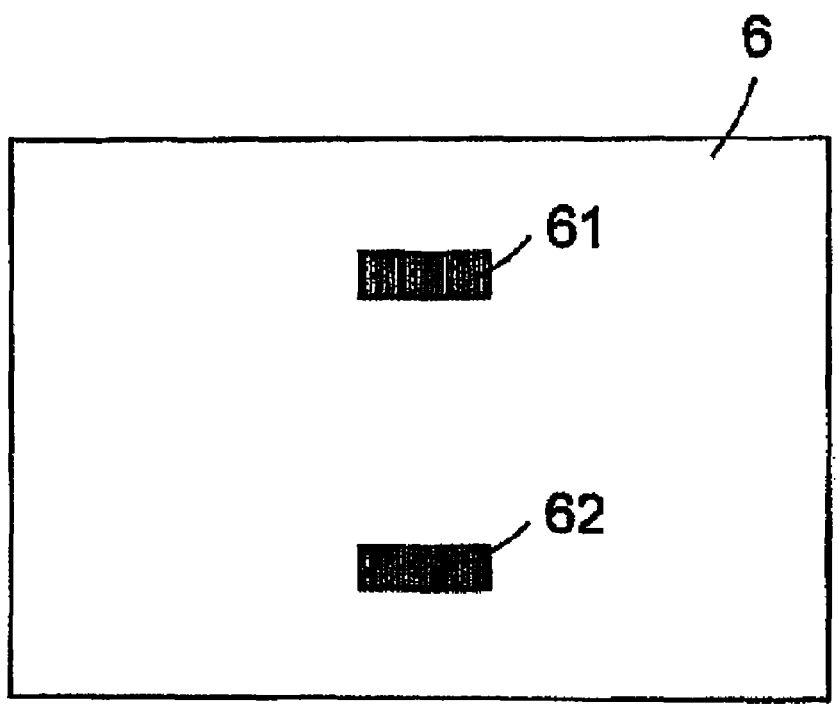
FIGS. 7A, 7B, and 7C are diagrams for explaining AF image detection areas on an image-pickup element in Embodiment 1.
Figure 7B:
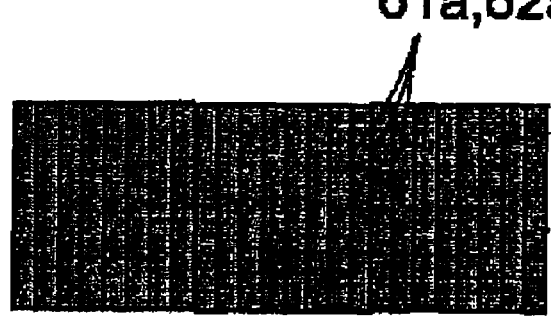

Next, the operation of detecting the images A and B in the image-pickup element 6 in Embodiment 1 will be described. FIG. 7A shows AF image detection areas 61 and 62 for photoelectrically converting the images A and B on the image-pickup element 6. FIG. 7B shows the enlarged AF image detection areas 61 and 62.

Figure 7C:
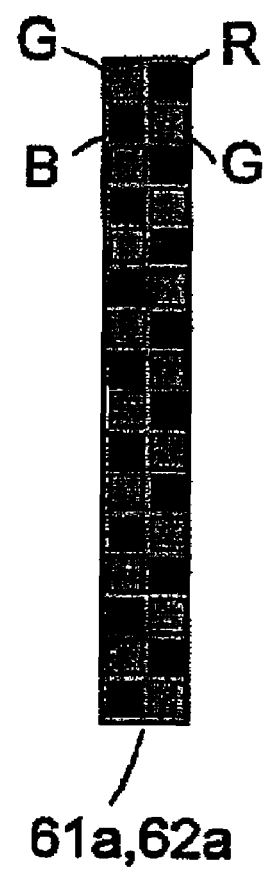

In each of the AF image detection areas, a plurality of image blocks 61*a* and 62*a* each formed of pixels arranged in two lines vertically (in the direction of the short side of the image-pickup element 6) are placed in the horizontal direction (the direction of the long side of the image-pickup element 6). FIG. 7C shows the arrangement of color filters in a single pixel block.

In Embodiment 1, color filters for R, G, and B are disposed in pixels with the Bayer array as shown in FIG. 7C. The image-pickup element 6 may be of a CCD type or a C-MOS type.

When the pixel blocks 61*a* and 62*a* shown in FIG. 7C are used as a unit pixel in AF image detection and their outputs are added to produce single image information, the AF image information in the vertical direction is averaged including color information. In the horizontal direction, a unit pixel forms an area for two pixels corresponding to the original resolution of the image-pickup element 6, so that sufficient resolution can be ensured in detecting a displacement of the AF images while the influence of chromatic dispersion is reduced.

Auto-correlation processing performed on the displacement amount in light intensity distribution between the paired AF images provided as described above enables detection of a defocus amount of the image-pickup optical system.

When a displacement of the AF images is detected for each of the color filters in the pixel blocks 61*a* and 62*a* shown in FIG. 7C, the light intensity peak can be precisely extracted for each color in the picked-up image to perform accurate focus detection for various picked-up images.

The controller 30 (see FIG. 1) calculates the addresses of the pixel blocks 61*a* and 62*a* corresponding to the zoom position and also calculates the in-focus position of the focus lens included in the image-pickup optical system 10 based on the detected focus state. The controller 30 then drives the focus lens via an actuator, not shown. In this manner, autofocus (AF) can be performed. Since the information on the pair of AF images can be provided by the image-pickup element 6, the drive direction and drive amount of the focus lens can be calculated quantitatively.

According to Embodiment 1, it is not necessary to use a secondary image-forming sensor dedicated to AF and the associated secondary image-forming optical system such as a separator lens as in the conventional optical apparatus. This can simplify the structure of the image-pickup apparatus. In addition, when the secondary image-forming optical system is present, a misalignment of the relative positions (optical axis positions) of the image-pickup optical system and the secondary image-forming optical system leads to degraded AF performance. However, in Embodiment 1, such concerns due to the structure are reduced and stable AF performance is achieved.

Figure 8:
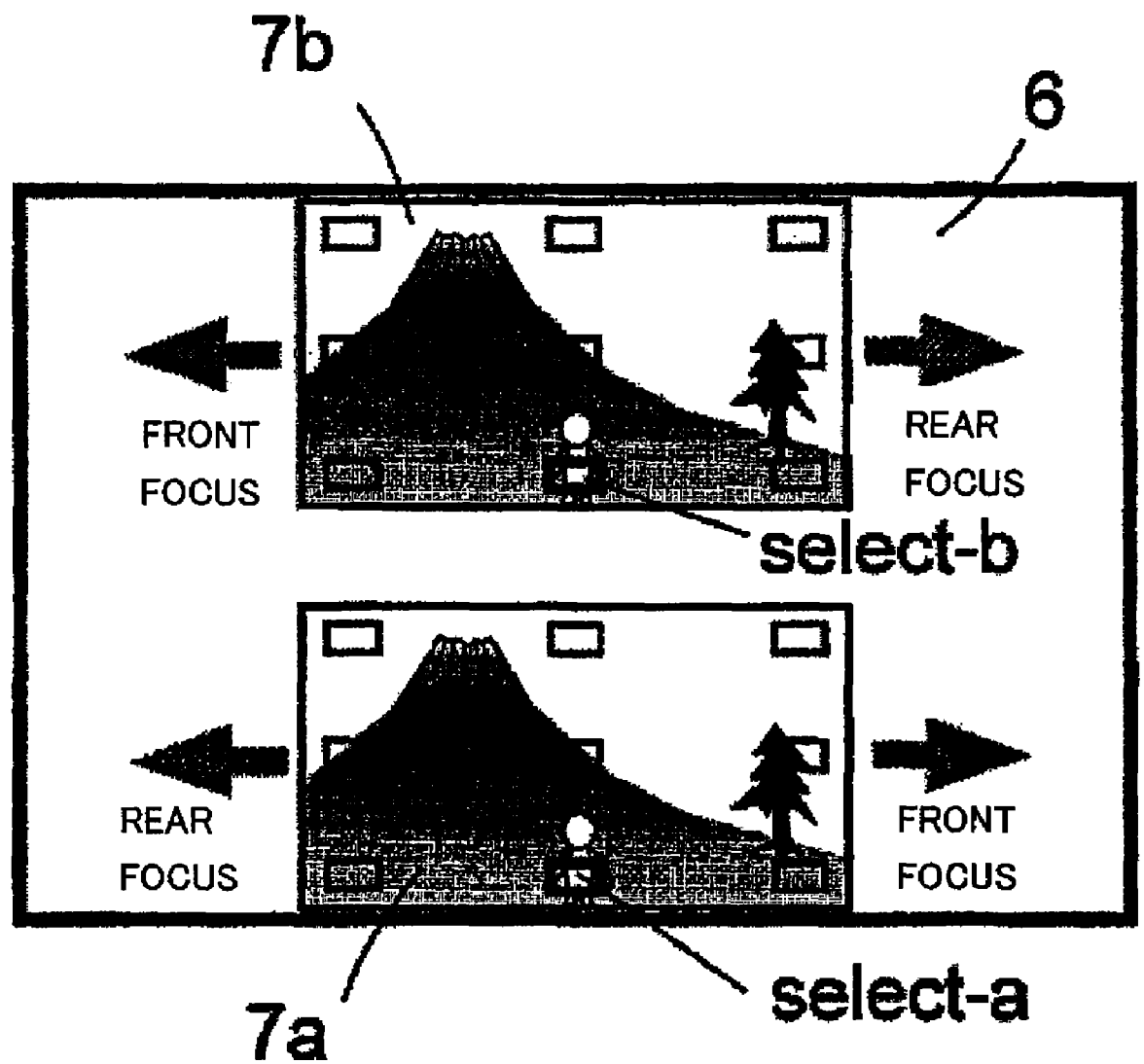
FIG. 8 shows an example of AF images in Embodiment 1.

FIG. 8 shows examples of the AF images (images A and B) in the AF image detection areas 7*a* and 7*b* formed by the luminous fluxes passing through the split pupils 41*a* and 41*b*, respectively, in the AF state shown in FIG. 1B. FIG. 8 shows the AF images when the image-pickup element 6 is seen from the opposite side to the light-receiving surface (front side), in which the inverted images of the original images are shown (images rotated 180 degrees about the optical axis).

In Embodiment 1, the lower AF image (image A) is shifted rightward and the upper AF image (image B) is shifted leftward in a front-focus state. In a rear-focus state, the shift directions of the AF images are inverted.

In this case, the two provided AF images are substantially equal to the actual picked-up image except for chromatic aberration in the vertical direction. Description is now made of the case where a photographer selects an area (peripheral area) away from the center of the image from a plurality of focus detection areas shown by small rectangular frames in FIG. 8. For example, when "select-a" and "select-b" are selected in FIG. 8, the AF image detection areas 61 and 62 are set on the image-pickup element 6 described in FIG. 7B with reference to the selected peripheral area. This enables AF to be performed not only in the central portion but also in the peripheral portion of the image in the TTL phase difference detection method.

As described above, in Embodiment 1, the light deflection unit 40 having the deflection optical elements 44a and 44b is provided integrally with the light-limiting elements 43a and 43b having the function similar to that of a mask for preventing an overlap of AF images which reduces the AF performance. This can achieve the focus detection performance with high accuracy based on the detection result of the AF images by the image-pickup element 6. In addition, it is possible to realize the structure which is compact and allows an increase in the size of the AF image detection area.

Embodiment 2

Figure 9A:
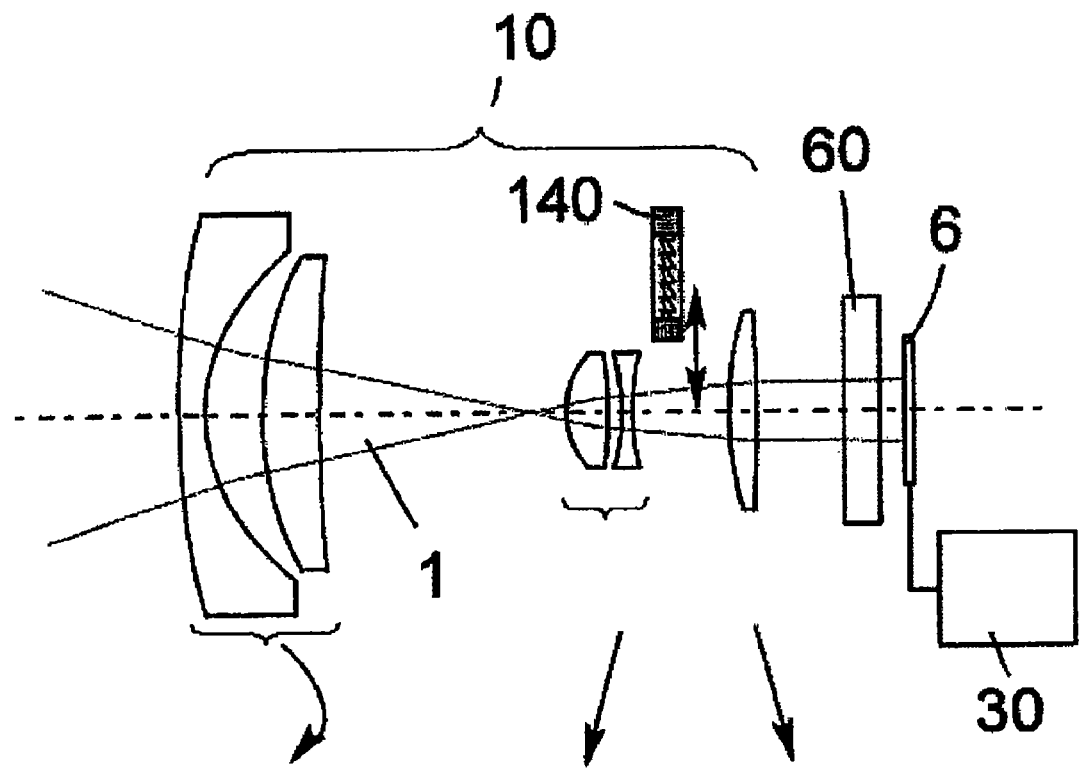
FIGS. 9A and 9B are sectional side views showing the structure of an optical apparatus which is Embodiment 2 of the present invention.
Figure 9B:
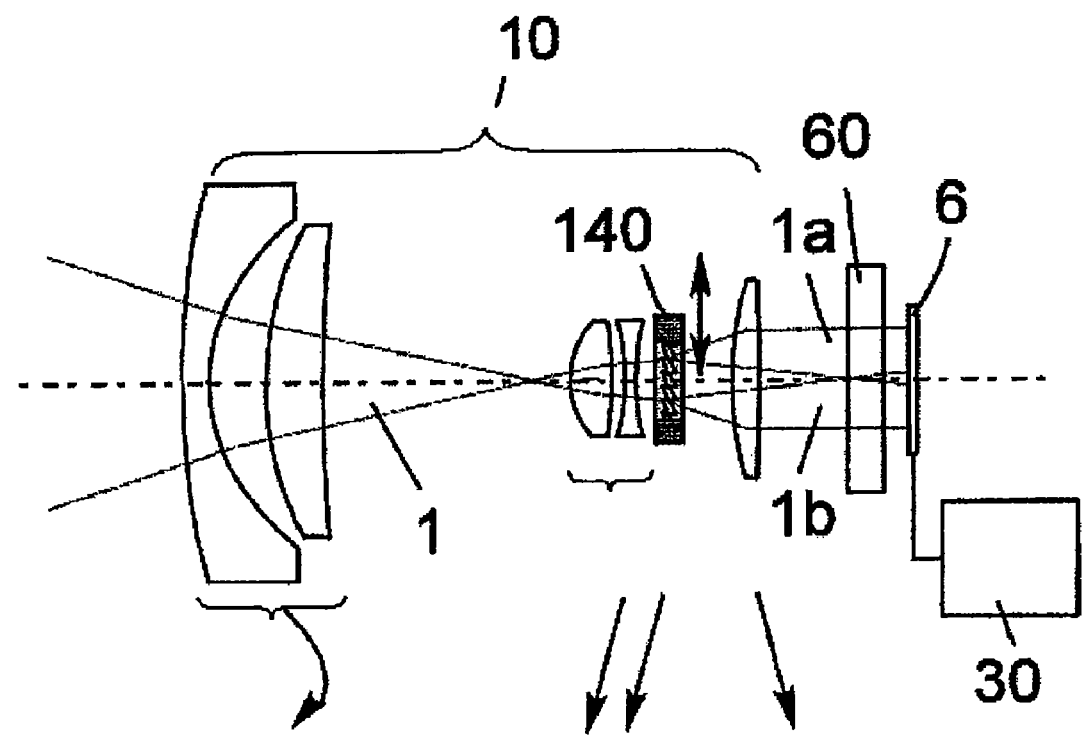

FIGS. 9A and 9B show the structure of an optical apparatus which is Embodiment 2 of the present invention. FIG. 9A shows the optical apparatus of Embodiment 2 when it picks up an image. FIG. 9B shows the optical apparatus of Embodiment 2 when it performs AF. In FIGS. 9A and 9B, components identical to those described in Embodiment 1 (FIGS. 1A and 1B) are designated with the same reference numerals as those in Embodiment 1.

In Embodiment 2, a light deflection unit 140 is inserted between a second lens and a third lens, that is, at a position away from the exit pupil of an image-pickup optical system 10 or from a position adjacent to the exit pupil. The light deflection unit 140 is movable in the direction of an optical axis together with the second lens in zooming.

Figure 10:
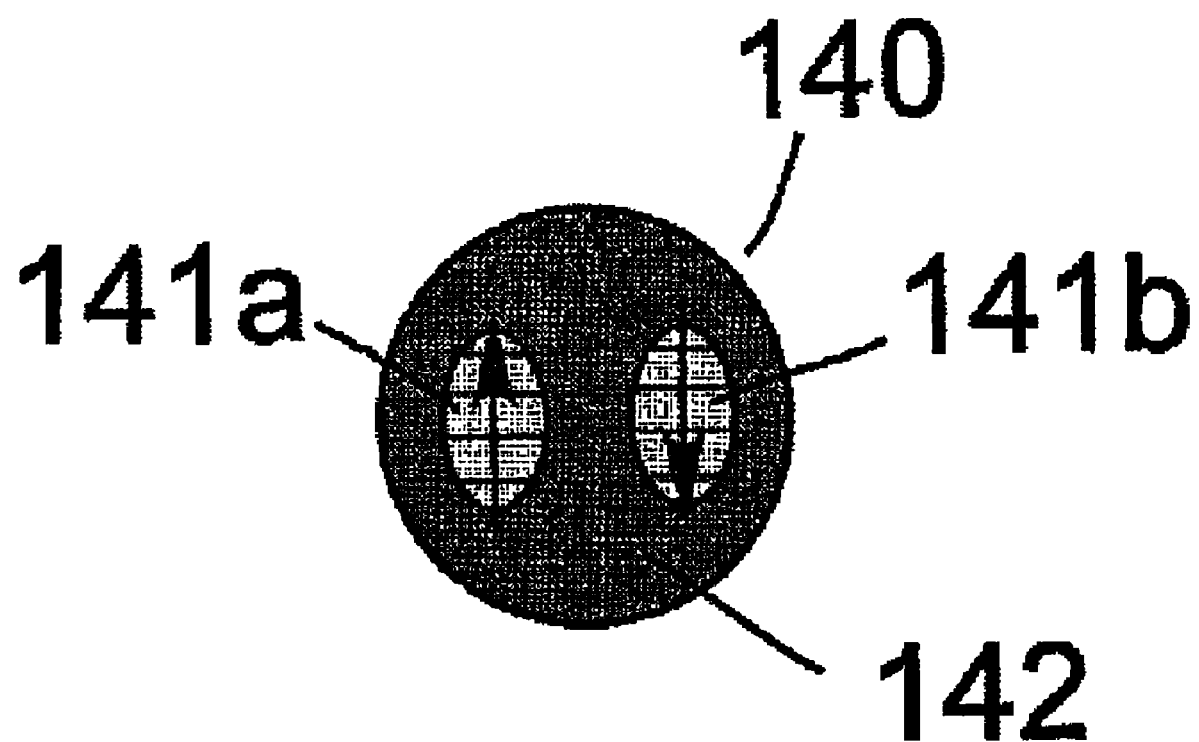
FIG. 10 is a schematic diagram showing a light deflection unit used in Embodiment 2.

FIG. 10 shows the light deflection unit 140 viewed from the front of the image-pickup optical system 10. The light deflection unit 140 has two pupils 141a and 141b separated by a light-shielding mask 142.

At each of the split pupils a deflection optical element which deflects a luminous flux light and a light-limiting element which limits the incident angle of the luminous flux on the deflection optical element are provided.

The deflection optical elements provided for the split pupils 141a and 141b have functions of deflecting luminous fluxes in directions indicated by arrows in FIG. 10, that is, in opposite directions. The deflection directions are substantially orthogonal to the pupil splitting direction.

The basic structure of the light deflection unit 140 of Embodiment 2 is similar to that of the light deflection unit 40 of Embodiment 1. However, since the light deflection unit 140 is inserted into the image-pickup optical system 10 at the different position from that in Embodiment 1, Embodiment 2 differs from Embodiment 1 in a proper limited incident angle and a proper luminous flux deflection angle. Thus, Embodiment 2 employs different prism shapes in the deflection optical element and the light-limiting element.

Figure 11A:
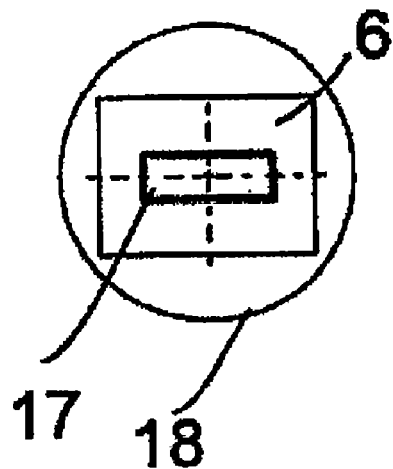
FIGS. 11A and 11B are diagrams for explaining image circles and AF image detection areas in Embodiment 2.
Figure 11B:
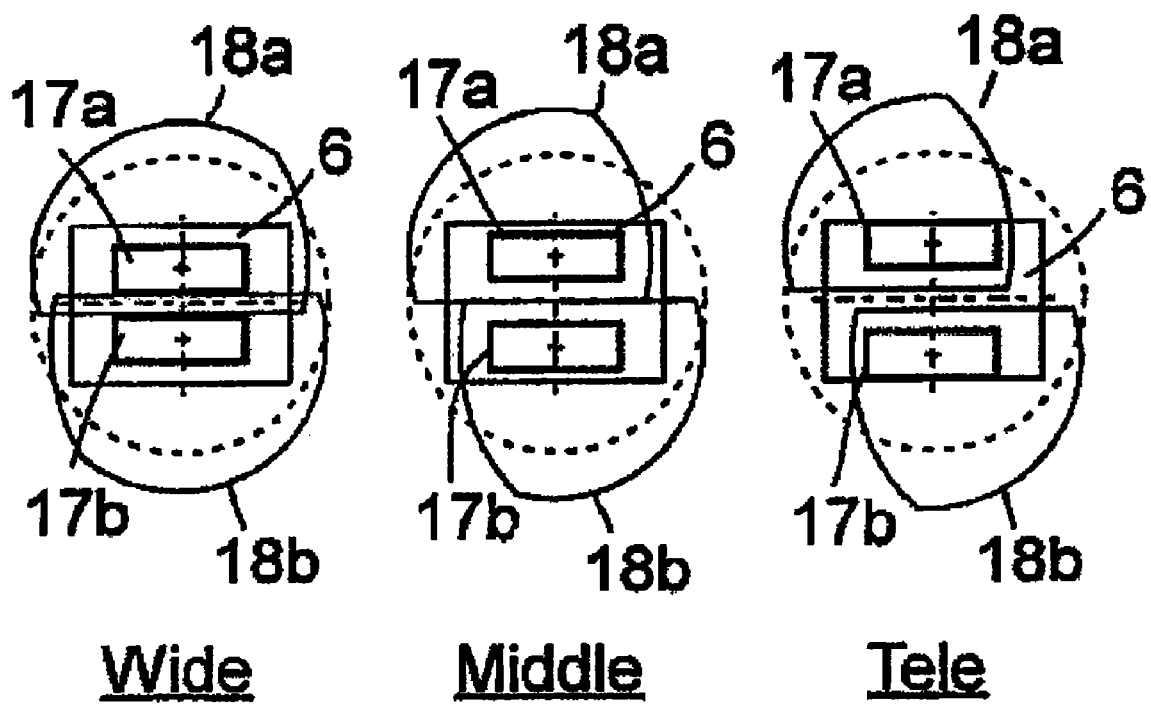

FIG. 11A shows an image circle 18 and an AF image detection area 17 on an image-pickup element 6 when the apparatus picks up an image and the light deflection unit 140 is not inserted as shown in FIG. 9A. FIG. 11B shows AF image circles 18a and 18b and AF image detection areas 17a and 17b for an image A and an image B at the wide-angle end, middle, and telephoto end when the apparatus performs AF and the light deflection unit 140 is inserted as shown in FIG. 9B.

With the use of the light deflection unit 140 of Embodiment 2, the image circle 18a formed by the luminous flux passing through the split pupil 141a has a shape with a lower portion removed by the function of the light-limiting element to limit the luminous flux angle. In addition, the combined deflection effects of the light-limiting element and the deflection optical element deflect the luminous flux passing through the split pupil 141a to move the image A to an upper portion of the image-pickup element 6.

Since the light deflection unit 140 is located away from the pupil position, vignetting occurs in a right portion of the image circle 18a.

On the other hand, the image circle 18b formed by the luminous flux passing through the split pupil 141b has a shape with an upper portion removed by the function of the light-limiting element to limit the luminous flux angle. In addition, the combined deflection effects of the light-limiting element and the deflection optical element deflect the luminous flux passing through the split pupil 141b to move the image B to a lower portion of the image-pickup element 6.

Since the light deflection unit 140 is located away from the pupil position, vignetting occurs in a left portion of the image circle 18b.

Adjusting the limited incident angle and the luminous flux deflection angle of the light deflection unit 140 enables to form the images A and B with no overlap in the AF image detection areas 17a and 17b on the image-pickup element 6. Only the image A can be detected in the AF image detection area 17a, and only the image B can be detected in the AF image detection area 17b.

The vignetting affects the image circles 18a and 18b to reduce their widths particularly on the telephoto side. However, appropriate widths of the AF image detection areas 17a and 17b can be ensured by adjusting the distance from the split pupils 141a and 141b shown in FIG. 10 and the optical system.

As shown in FIG. 11B, changing the zoom position moves the central positions of the images A and B. However, sufficient heights of the AF image detection areas 17a and 17b can be provided by adjusting the luminous flux deflection angle and the limited incident angle.

As described in Embodiments 1 and 2, the light deflection unit can be located not only at the pupil position or the position close thereto but also at the position away from the pupil position or from the position close thereto. As a result, only minimum limitations are imposed on the image-pickup optical system, and the whole image-pickup optical system including the light deflection unit can be designed with a higher degree of flexibility.

When the light deflection unit is formed of the opposite prism sheets as in Embodiments 1 and 2, a high transmission efficiency of approximately 70% can be achieved at the center of the AF image.

Embodiment 3

FIGS. 12A and 12B show the basic structure of an optical apparatus which is Embodiment 3 of the present invention when it performs AF. FIG. 12A shows only the luminous flux forming an image A of luminous fluxes split at the pupil position. FIG. 12B shows an image circle 28a for the image A on an image-pickup element 6. In FIGS. 12A and 12B, components identical to those described in Embodiment 1 (FIGS. 1A and 1B) are designated with the same reference numerals as those in Embodiment 1.

Reference numeral 245a in FIG. 12A shows a blind element serving as a light-limiting element disposed at one of two split pupils in a light deflection unit of Embodiment 3. Reference numeral 244a shows a deflection optical element which is formed of a prism sheet similar to that of Embodiment 1. The light deflection unit of Embodiment 3 is placed within an image-pickup optical system 20 similarly to Embodiments 1 and 2.

Embodiment 3 will be described in conjunction with the image-pickup optical system 20 formed of a fixed-focal-length lens. However, the image-pickup optical system 20 may be formed of a zoom lens.

The blind element 245a is formed of a viewing-angle adjusting film or the like manufactured by Sumitomo 3M Limited. The blind element 245a has a blind structure including thin light-shielding walls disposed at certain intervals between transparent films. In other words, it has alternating areas for transmitting luminous flux and areas for blocking luminous flux. This provides the function of limiting the luminous flux angle to prevent passing of a luminous flux with an incident angle equal to or larger than a predetermined incident angle.

On the other hand, since the deflection optical element 244a can deflect a luminous flux, the deflection optical element 244a and the blind element 245a can be formed as a unit to realize the light deflection unit having the function of limiting the luminous flux angle.

If the decentered amount of an image circle 28a shown in FIG. 12B is given, the angle of deflection by the deflection optical element 244a is determined from the relationship with the image-pickup optical system 20 and thus the shape of the prism sheet can be specified.

In the blind element 245a, the light-shielding walls are formed perpendicularly to the transparent films such that the maximum transmittance is obtained at the incident angle of zero degrees. The limited incident angle is adjusted to prevent an overlap of the images A and B in AF image detection areas on the image-pickup element 6. The limited incident angle can be adjusted by using the thickness, interval, and the height of the light-shielding walls as parameters.

Specifically, of the luminous flux passing through the inside of the image-pickup optical system 20, only the luminous flux at an incident angle of +5 degrees in the vertical direction is transmitted through the blind element 245a, and the transmitted luminous flux is deflected by the deflection optical element 244a. This causes the image circle 28a to have the shape with its center located at an upper portion and a constant height in the vertical direction as shown in FIG. 12B. FIG. 12B shows the image circle after the effect of vignetting is removed.

As in Embodiments 1 and 2, the elements provided by rotating the blind element 245a and the deflection optical element 244a by 180 degrees on the surface of the light deflection unit are disposed at the other split pupil of the light deflection unit of Embodiment 3. The structure can achieve favorable AF images having a phase difference with no overlap of the images A and B in the AF image detection areas on the image-pickup element 6.

Embodiment 4

FIGS. 13A and 13B show the basic structure of an optical apparatus which is Embodiment 4 of the present invention when it performs AF. FIG. 13A shows only the luminous flux forming an image A of luminous fluxes split at the pupil position. FIG. 13B shows an image circle 38a for the image A on an image-pickup element 6. In FIGS. 13A and 13B, components identical to those described in Embodiment 1 (FIGS. 1A and 1B) are designated with the same reference numerals as those in Embodiment 1.

Reference numeral 344a in FIG. 13A shows a deflection optical element disposed at one of two split pupils in a light deflection unit of Embodiment 4 and is formed of a prism sheet similar to that of Embodiment 1. Reference numeral 345a shows a blind element serving as a light-limiting element. The light deflection unit of Embodiment 4 is placed within an image-pickup optical system 20 similarly to Embodiments 1 and 2.

Embodiment 4 will be described in conjunction with the image-pickup optical system 20 formed of a fixed-focal-length lens. However, the image-pickup optical system 20 may be formed of a zoom lens.

In Embodiment 4, the blind element 345a and the deflection optical element 344a can be formed as a unit to realize the light deflection unit having the function of limiting the luminous flux angle, similarly to Embodiment 3. However, the blind element 345a and the deflection optical element 344a are placed in the opposite order to that in Embodiment 3. The blind element 345a limits the emergent angle of the luminous flux from the deflection optical element 344a to limit the area on the image-pickup element 6 in which an AF image is formed by the luminous flux emerging from the light deflection unit.

Specifically, the optical axis (that is, the central principal ray) of the luminous flux passing through the inside of the image-pickup optical system 20 is deflected upward by five degrees by the deflection optical element 344a. The blind element 345a transmits (passes) only the luminous flux at an incident angle of 5±5 degrees (0 to 10 degrees). This causes the image circle 38a to have the shape with its center located at an upper portion and the same height in the vertical direction as shown in FIG. 13B.

To set the emergent angle from the blind element 345a to 5±5 degrees (0 to 10 degrees), light-shielding walls may be arranged at an inclination of five degrees with respect to transparent films.

As in Embodiments 1 and 2, the element provided by rotating the deflection optical element 344a and the blind element 345a by 180 degrees on the surface of the light deflection unit are located on the other split pupil of the light deflection unit of Embodiment 4. The structure can achieve favorable AF images having a phase difference with no overlap of the images A and B in AF image detection areas on the image-pickup element 6.

Embodiment 5

FIGS. 14A and 14B show the basic structure of an optical apparatus which is Embodiment 5 of the present invention when it performs AF. FIG. 14A shows only the luminous flux forming an image A of luminous fluxes split at the pupil position. FIG. 14B shows an image circle 48a for the image A on an image-pickup element 6. In FIGS. 14A and 14B, components identical to those described in Embodiment 1 (FIGS. 1A and 1B) are designated with the same reference numerals as those in Embodiment 1.

Reference numeral 444a in FIG. 14A shows a deflection optical element disposed at one of two split pupils in a light deflection unit of Embodiment 5 and is formed of a prism sheet similar to that of Embodiment 1. Reference numeral 446a and 447a show an entrance-side mask element (or an entrance-side member) and an emergence-side mask element (or an emergence-side member) serving as light-limiting elements disposed on the side of an entrance surface and the side of an emergence surface of the deflection optical element 444a. The light deflection unit of Embodiment 5 is placed within an image-pickup optical system 20 similarly to Embodiments 1 and 2.

Embodiment 5 will be described in conjunction with the image-pickup optical system 20 formed of a fixed-focal-length lens. However, the image-pickup optical system 20 may be formed of a zoom lens.

Each of the entrance-side mask element 446a and the emergence-side mask element 447a has alternate areas for transmitting a luminous flux and areas for blocking the luminous flux. The entrance-side mask element 446a differs from the emergence-side mask element 447a in their phases in the vertical direction. FIG. 15A shows the shape of the entrance-side mask element 446a viewed from the front of the image-pickup optical system 20. FIG. 15B is an enlarged view of the entrance-side mask element 446a, the deflection optical element 444a, and the emergence-side mask element 447a viewed from the side.

In Embodiment 5, the entrance-side mask element 446a and the emergence-side mask element 447a having different phases in the vertical direction are disposed before and after the deflection optical element 444a for deflecting light to realize the function of limiting the luminous flux angle similar to that of the blind elements described in Embodiments 3 and 4. Specifically, the entrance-side mask element 446a limits the incident angle of the luminous flux on the deflection optical element 444a, while the emergence-side mask element 447a limits the emergence angle of the luminous flux from the deflection optical element 444a, that is, the luminous flux emerging from the light deflection unit. This causes an image circle 48a to have the shape with its center located at an upper portion and a constant height in the vertical direction as shown in FIG. 14B.

In this manner, the deflection optical element 444a and the entrance-side and emergence-side mask elements 446a and 447a can be formed as a unit to realize the light deflection unit having the function of limiting the luminous flux angle.

As in Embodiments 1 and 2, the element provided by rotating the deflection optical element 444a and the entrance-side and emergence-side mask elements 446a and 447a by 180 degrees on the surface of the light deflection unit are disposed at the other split pupil of the light deflection unit of Embodiment 5. This can achieve favorable AF images having a phase difference with no overlap of the images A and B in AF image detection areas on the image-pickup element 6.

Embodiment 6

Figure 16A:
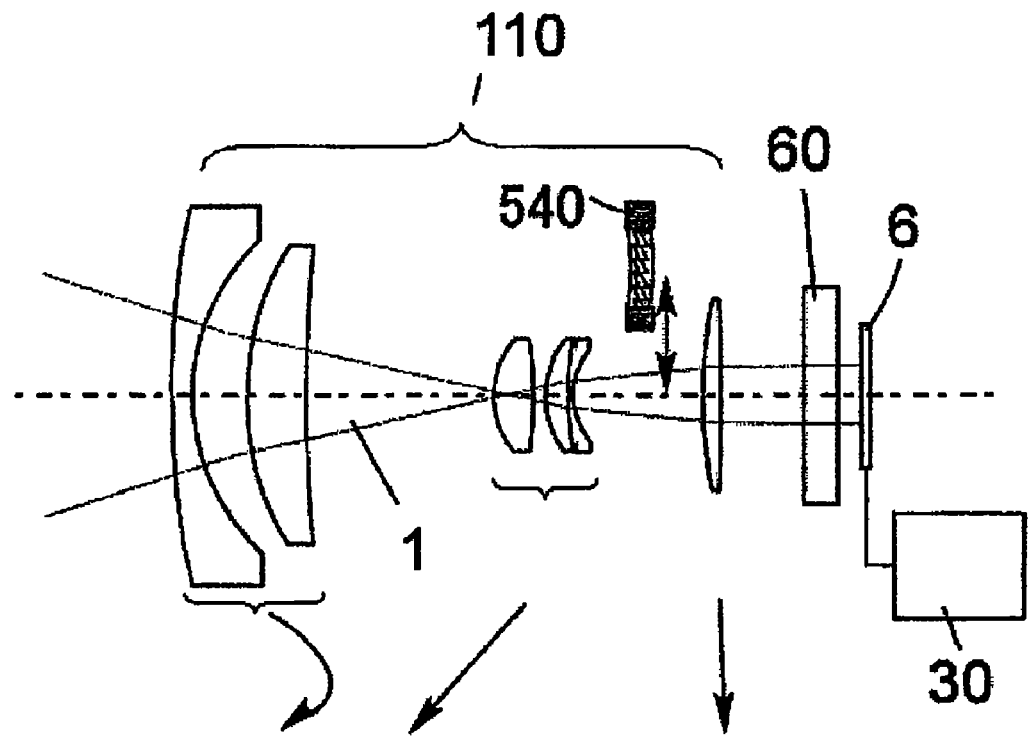
FIGS. 16A and 16B are sectional side views showing the structure of an optical apparatus which is Embodiment 6 of the present invention.
Figure 16B:
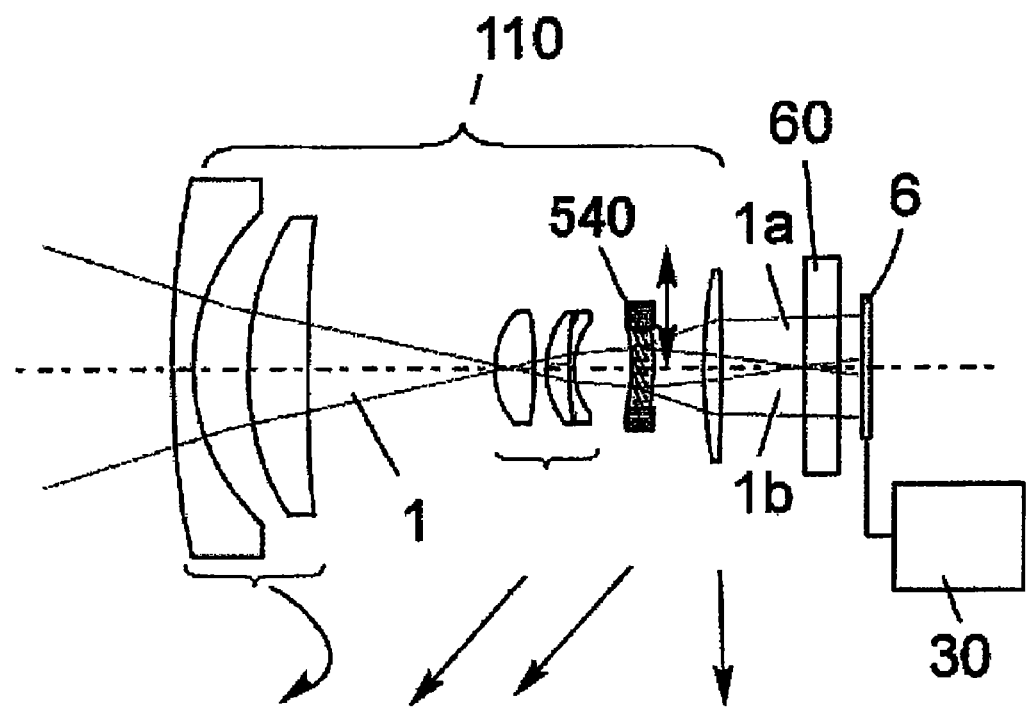

FIGS. 16A and 16B show the structure of an optical apparatus which is Embodiment 6 of the present invention. FIG. 16A shows the optical apparatus when it picks up an image. FIG. 16B shows the optical apparatus when it performs AF. In FIGS. 16A and 16B, components identical to those described in Embodiment 1 (FIGS. 1A and 1B) are designated with the same reference numerals as those in Embodiment 1.

In FIGS. 16A and 16B, reference numeral 110 shows an image-pickup optical system which is formed of a so-called three-lens-unit zoom lens. Movable lenses can be moved as indicated by arrows shown under the optical system to change the interval between the lens surfaces, thereby changing a focal length between the wide-angle end and the telephoto end.

Reference numeral 540 shows a light deflection unit which is movable into and out of inner space on the optical path of the image-pickup optical system 110, specifically, space between a second lens and a third lens. The space corresponds to the position of the exit pupil of the image-pickup optical system 110 or the position adjacent to the exit pupil. The light deflection unit 540 is movable in the direction of the optical axis together with the second lens in zooming. The detailed structure of the light deflection unit 540 will be described later.

Figure 17:
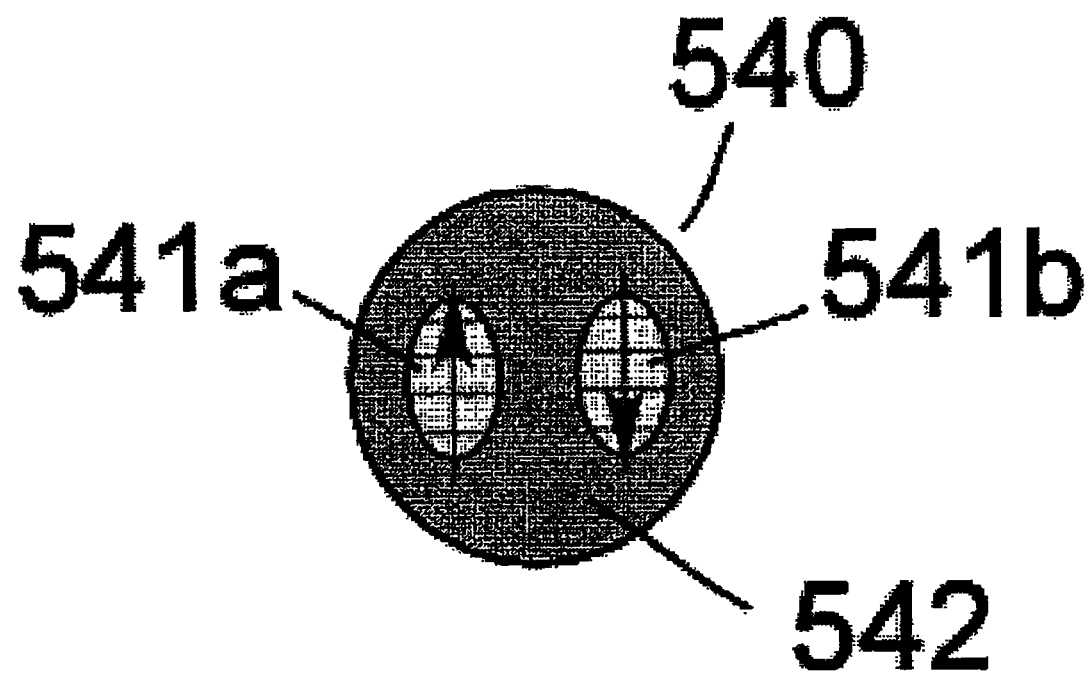
FIG. 17 is a schematic diagram showing a light deflection unit used in Embodiment 6.

FIG. 17 show the light deflection unit 540 viewed from the front of the image-pickup optical system 110. The light deflection unit 540 has two pupils 541a and 541b split by a light-shielding mask 542.

Each of the split pupils has a deflection optical element which deflects a luminous flux and a light-limiting element which limits the incident angle of the luminous flux on the deflection optical element.

The deflection optical elements provided for the split pupils 541a and 541b have functions of deflecting luminous fluxes in directions indicated by arrows in FIG. 17, that is, in opposite directions. The deflection directions are substantially orthogonal to the pupil splitting direction.

As shown in FIG. 16B, a luminous flux (first luminous flux) 1a passing through the split pupil 541a forms an AF image (hereinafter also referred to an image A) on an upper portion of an image-pickup element 6. A luminous flux (second luminous flux) 1b passing through the split pupil 541b forms an AF image (hereinafter also referred to an image B) on a lower portion of the image-pickup element 6.

The structure of the light deflection unit 540 is now described in detail. First, for comparison, the image-pickup optical system 10 described in Embodiments 1 and 2 will be described with reference to FIG. 18. Reference numeral 1c shows a luminous flux at the central image height in the image-pickup optical system 10 and reference numeral 1d shows a luminous flux at an image height other than the central image height.

Figure 18:
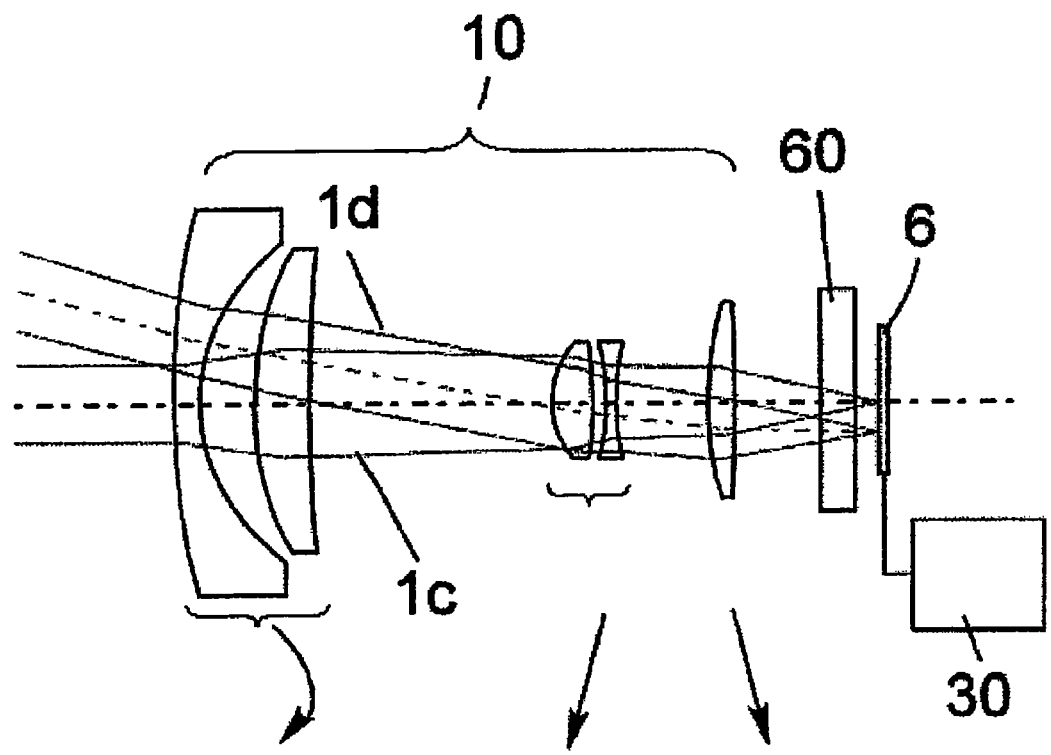
FIG. 18 is a diagram for explaining luminous fluxes through an image-pickup optical system shown in FIG. 1.

As seen from FIG. 18, the luminous fluxes 1c and 1d are substantially collimated between the first and second lenses and between the second and third lenses. Thus, providing the light deflection unit 40 of Embodiment 1 or the light deflection unit 140 of Embodiment 2 which can selectively limit the angle of the luminous flux enables to provide the function of limiting the light transmission depending on the image height such that the luminous flux 1c is transmitted and deflected and the luminous flux 1d is not transmitted under the total reflection condition.

Next, luminous fluxes in the image-pickup optical system 110 of Embodiment 6 will be described with reference to FIG. 19. Reference numeral 1e shows a luminous flux at the central image height and reference numeral 1f shows a luminous flux at an image height other than the central image height. As seen from FIG. 19, each luminous flux between the first and second lenses of the image-pickup optical system 110 is collimated, but each luminous flux between the second and third lenses is not collimated. The collimated luminous flux in Embodiment 6 includes not only a completely collimated luminous flux but also a luminous flux which is not completely collimated but can be considered to be collimated optically. In other words, it means being substantially collimated. This also applies to the following description.

In the image-pickup optical system 110, the light deflection unit as described above can be placed between the second and third lenses in terms of space. However, some light rays of the luminous flux at the central image height are blocked and others are transmitted.

Figures 20A, 20B:
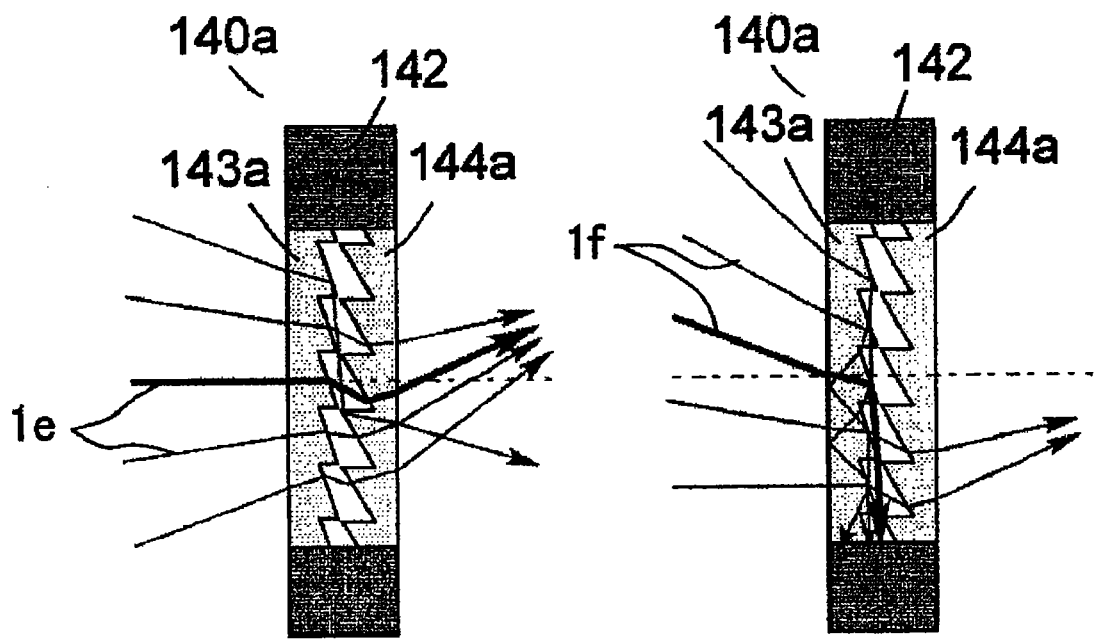
FIGS. 20A and 20B are diagrams for explaining transmitted light rays in the light deflection unit of Embodiment 2.

FIGS. 20A and 20B show luminous fluxes when a light deflection unit 140a similar to that described in Embodiment 2 is inserted between the second and third lenses of the image-pickup optical system 110. The light deflection unit 140a shown in FIGS. 20A and 20B is formed of a light-limiting element 143a and a deflection optical element 144a disposed at one of two split pupils of the light deflection unit 140. The light-limiting element 143a and the deflection optical element 144a are provided by forming prism shapes on a parallel plate. FIG. 20A shows a luminous flux 1e at the central image height, while FIG. 20B shows a luminous flux 1f at an image height other than the central image height.

In FIG. 20A, all the light rays are desirably transmitted at a predetermined angle. However, as seen from FIG. 20A, some light rays are not transmitted through the light deflection unit 140a depending on the incident positions of the light rays. On the other hand, in FIG. 20B, all the light rays are desirable blocked. However, as seen from FIG. 20B, some light rays are transmitted through the light deflection unit 140a depending on the incident positions of the light rays.

This results in ghost light on the associated AF images having a phase difference on the image-pickup element to cause degraded AF performance.

Figure 19:
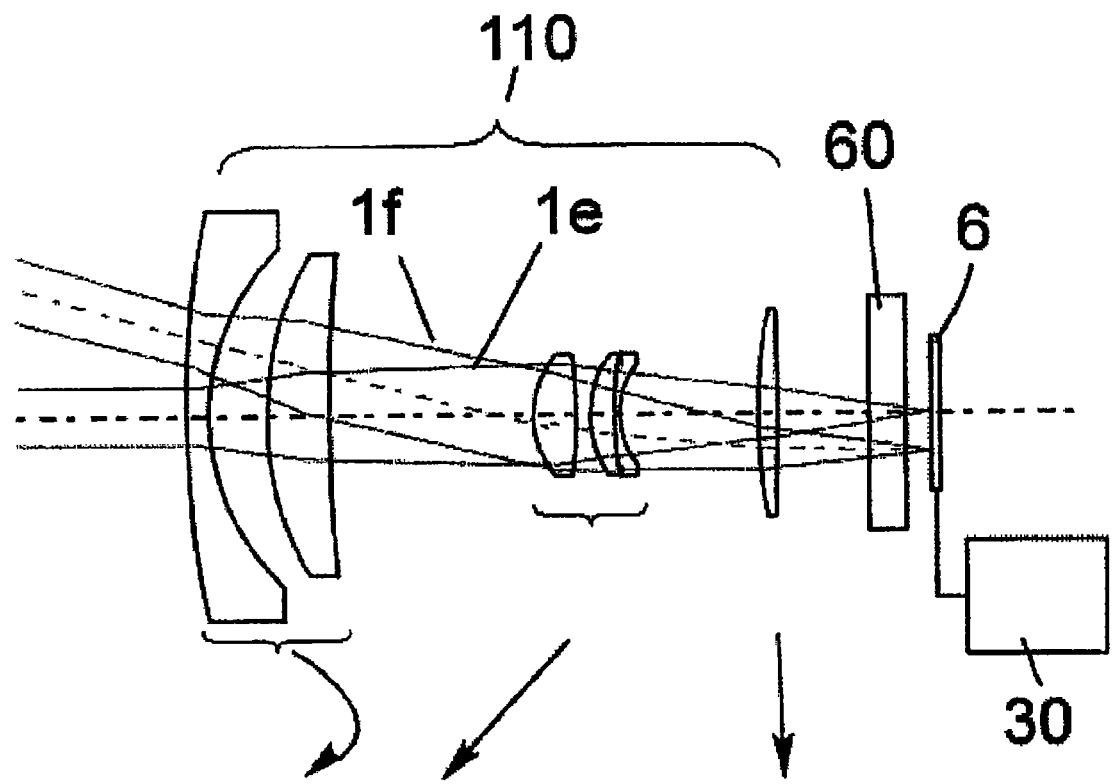
FIG. 19 is a diagram for explaining luminous fluxes through an image-pickup optical system shown in FIG. 16.
Figure 21A:
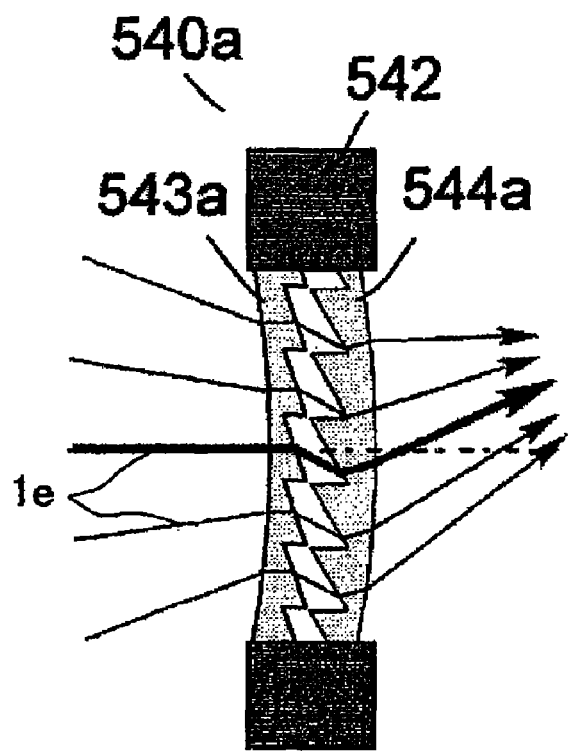
FIGS. 21A and 21B are diagrams for explaining transmitted light rays in the light deflection unit of Embodiment 6.
Figure 21B:
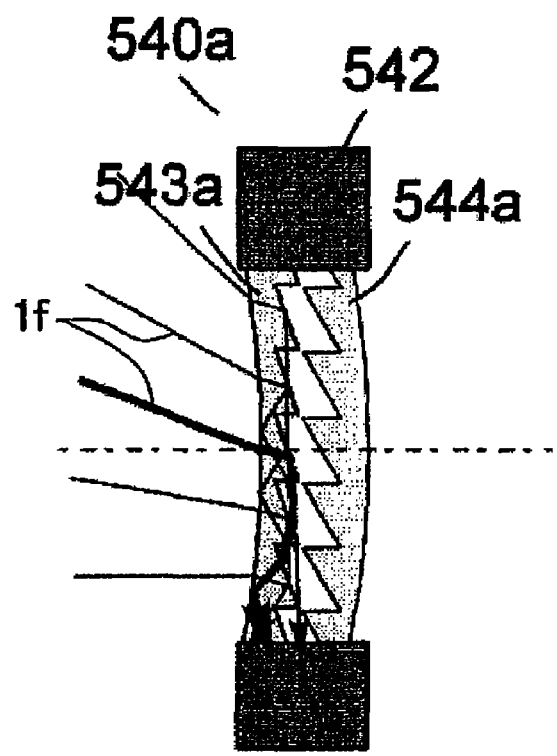

FIGS. 21A and 21B show luminous fluxes when a light deflection unit 540a of Embodiment 6 suitable for the image-pickup optical system 110 shown in FIG. 19 is inserted between the second and third lenses of the image-pickup optical system 110. The light deflection unit 540a shown in FIGS. 21A and 21B is formed of a light-limiting element 543a and a deflection optical element 544a disposed at one of two split pupils of the light deflection unit 540.

Each of the light-limiting element 543a and the deflection optical element 544a has a surface with a curvature and a prism-shaped portion on the surface opposite to the curved surface. FIG. 21A shows a luminous flux 1e at the central image height, while FIG. 21B shows a luminous flux 1f at an image height other than the central image height.

An entrance surface (first surface) of the light-limiting element 543a is formed as a curved surface having a negative optical power (the optical power means the reciprocal of a focal length: synonymous with refractive power) such that the converging luminous flux (light rays) incident thereon is once collimated in the light-limiting element 543a. Since all the light rays are collimated by the first surface of the light-limiting element 543a, all the light rays impinge on the oblique surfaces of the prism-shaped portion of an emergence surface (second surface) having the light-limiting function at an angle in parallel with the optical axis in FIG. 21A. In FIG. 21B, all the light rays impinge on the oblique surfaces at an angle which satisfies the total reflection condition.

In FIG. 21A, all the light rays are desirably transmitted at a predetermined angle. As seen from FIG. 21A, most of the light rays are transmitted through the light deflection unit 540a at a desirable angle regardless of the incident position of the light ray. For this reason, the structure can be realized with favorable use efficiency of light. On the other hand, in FIG. 21B, all the light rays are desirably blocked. As seen from FIG. 21B, most of the light rays are blocked by the light-limiting element 540a. Thus, the structure can be realized with reduced ghost light.

An emergence surface of the deflection optical element 544a is a curved surface having a positive optical power which changes the incident luminous flux into the original converging luminous flux, that is, which cancels the optical power of the first surface of the light-limiting element 543a. As a result, the individual light rays can be deflected at substantially the same angles to realize the stable deflection function while the reliable light-limiting function is provided.

As described above, the curvature of the first surface of the light-limiting element 543a is set appropriately for the luminous flux passing through the image-pickup optical system, so that degraded AF images having a phase difference can be prevented and the light deflection unit 540a (540) can be disposed in sufficient space between the lens surfaces.

Figure 22A:
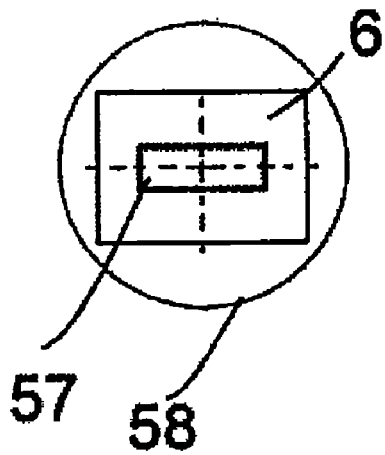
FIGS. 22A and 22B are diagrams for explaining image circles and AF image detection areas in Embodiment 6.
Figure 22B:
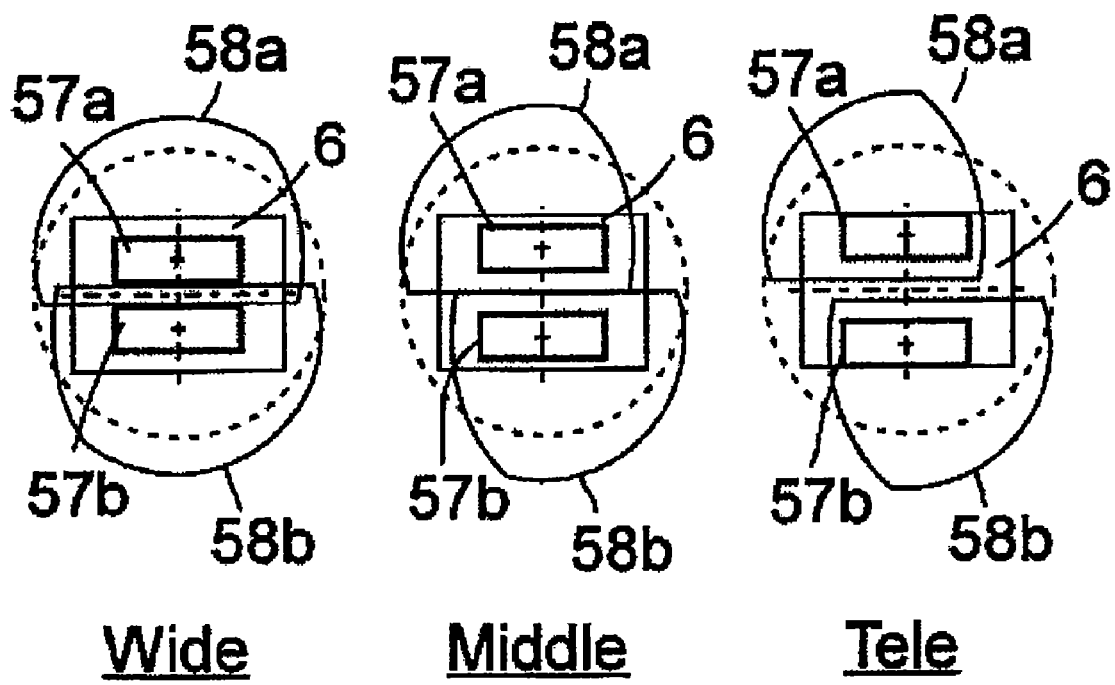

FIG. 22A shows an image circle 58 and an AF image detection area 57 on the image-pickup element 6 when the apparatus picks up an image and the light deflection unit 540 is not inserted as shown in FIG. 16A. FIG. 22B shows image circles 58a and 58b and AF image detection areas 57a and 57b for images A and B at the wide-angle end, middle, and telephoto end when the apparatus performs AF and the light deflection unit 540 is inserted as shown in FIG. 16B.

In Embodiment 6, with the use of the light deflection unit 540 similarly to Embodiment 2, the image circle 58a formed by the luminous flux passing through the split pupil 541a has a shape with its lower portion removed by the function of the light-limiting element to limit the luminous flux angle. In addition, the combined deflection effects of the light-limiting element and the deflection optical element deflect the luminous flux passing through the split pupil 541a to move the image A to an upper portion of the image-pickup element 6.

Since the light deflection unit 540 is located away from the pupil position, vignetting occurs in a right portion of the image circle 58a.

On the other hand, the image circle 58b formed by the luminous flux passing through the split pupil 541b has a shape provided by rotating the image circle 58a by 180 degrees about the optical axis.

Adjusting the limited incident angle and the luminous flux deflection angle of the light deflection unit 540 enables to form the images A and B with no overlap in the AF image detection areas 57a and 57b on the image-pickup element 6. Only the image A can be detected in the AF image detection area 57a, and only the image B can be detected in the AF image detection area 57b.

The vignetting affects the image circles 58a and 58b to reduce their widths particularly on the telephoto side. However, appropriate widths of the AF image detection areas 57a and 57b can be ensured by adjusting the distance from the split pupils 541a and 541b shown in FIG. 17 and the optical system.

As shown in FIG. 22B, changing the zoom position moves the central positions of the images A and B. However, sufficient heights of the AF image detection areas 57a and 57b can be ensured by adjusting the luminous flux deflection angle and the limited incident angle.

As described above, in Embodiment 6, the light deflection unit 540 having the deflection optical elements 544a and 544b is provided integrally with the light-limiting elements 543a and 543b having the function similar to that of a mask for preventing an overlap of the AF images which reduces the AF performance. This can achieve the focus detection performance with high accuracy based on the detection result of the AF images by the image-pickup element 6. In addition, it is possible to realize the structure which is compact and allows an increase in the size of the AF image detection area. In addition, the curvature of the first surfaces of the light-limiting elements 543a and 543b can increase the flexibility in designing various image-pickup optical systems to prevent degradation (such as a reduced light amount and ghost) of the AF images having a phase difference.

Embodiment 7

Figure 23A:
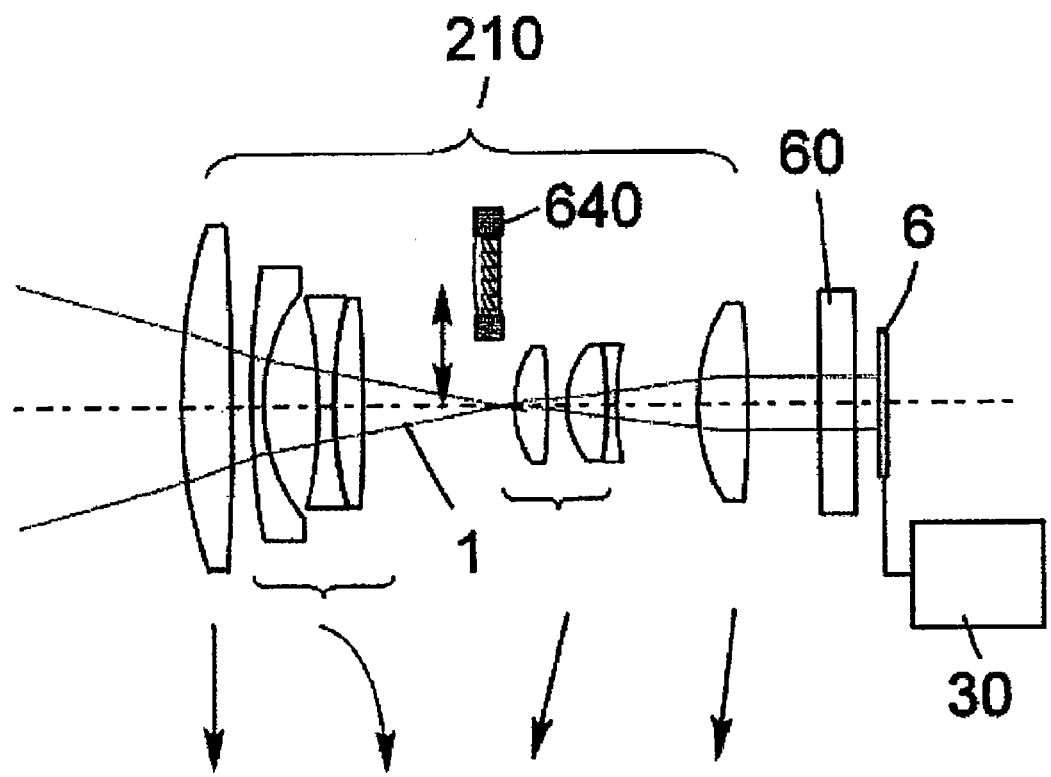
FIGS. 23A and 23B are sectional side views showing the structure of an optical apparatus which is Embodiment 7 of the present invention.
Figure 23B:
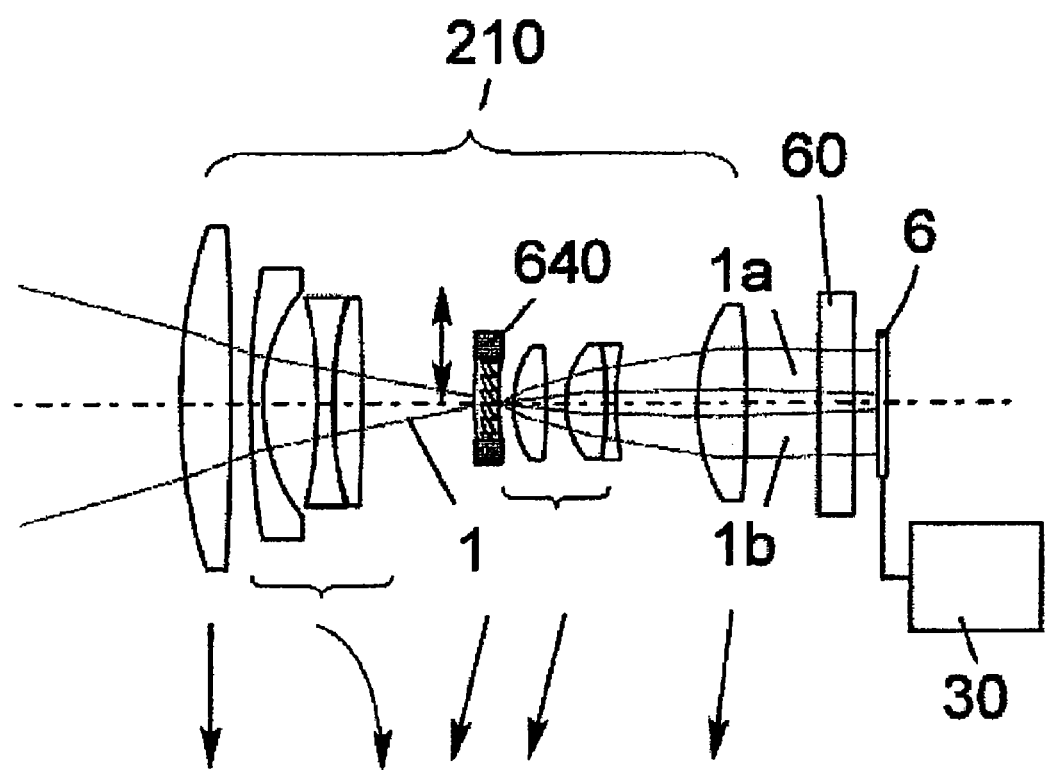

FIGS. 23A and 23B show the structure of an optical apparatus which is Embodiment 7 of the present invention. FIG. 23A shows the optical apparatus when it picks up an image. FIG. 23B shows the optical apparatus when it performs AF. In FIGS. 23A and 23B, components identical to those described in Embodiment 1 (FIGS. 1A and 1B) are designated with the same reference numerals as those in Embodiment 1.

An image-pickup optical system 210 in Embodiment 7 is formed of a four-lens-unit zoom lens including a convex lens, a concave lens, a convex lens, and a convex lens. Movable lenses can be moved as indicated by arrows shown under the optical system to change the interval between the lens surfaces, thereby changing a focal length between the wide-angle end and the telephoto end.

A light deflection unit 640 is inserted between a second lens and a third lens, that is, at a position adjacent to the position of the exit pupil of the image-pickup optical system 210. The light deflection unit 640 is movable in the direction of the optical axis together with the third lens in zooming.

Reference numeral 1 shows a luminous flux entering the image-pickup optical system 210 (only a luminous flux passing through the center of the pupil of the image-pickup optical system 210 is shown in FIGS. 23A and 23B).

Figure 24:
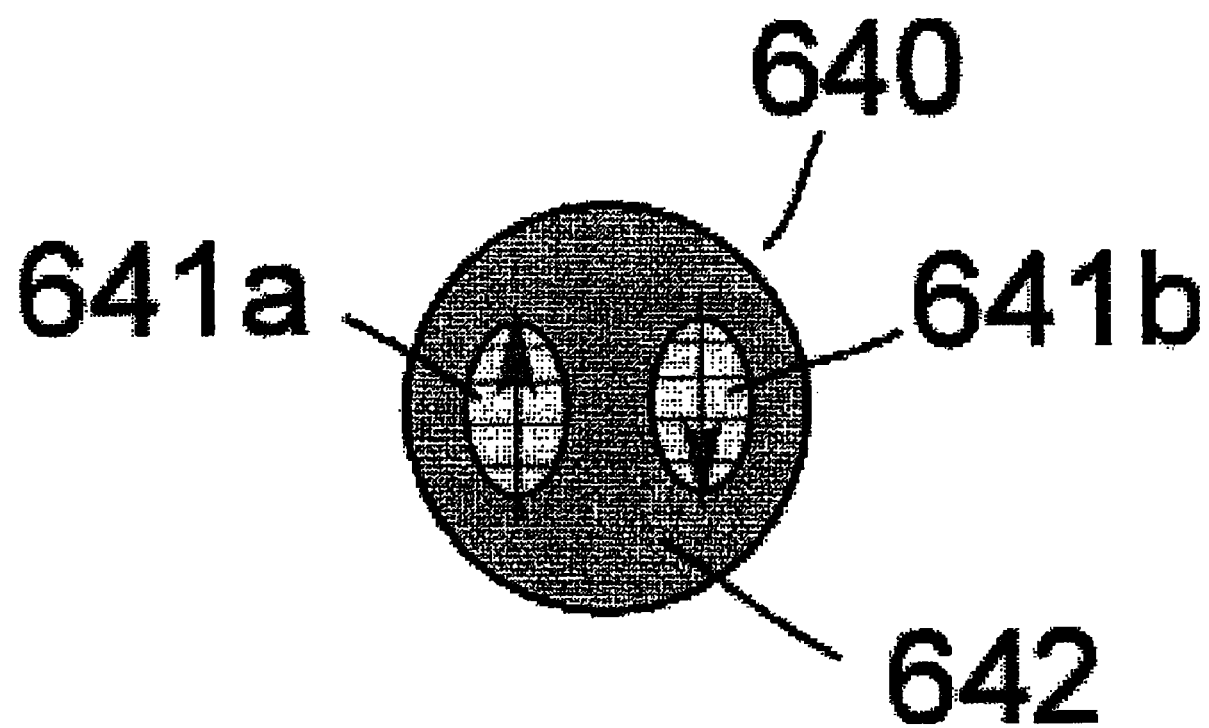
FIG. 24 is a schematic diagram showing a light deflection unit used in Embodiment 7.

FIG. 24 shows the light deflection unit 640 viewed from the front of the image-pickup optical system 210. The light deflection unit 640 has two pupils 641a and 641b split by a light-shielding mask 642.

Each of the split pupils is provided with a deflection optical element which deflects a luminous flux and a light-limiting element which limits the incident angle of the luminous flux on the deflection optical element.

The deflection optical elements provided for the split pupils 641a and 641b have functions of deflecting luminous fluxes in directions indicated by arrows in FIG. 24, that is, in opposite directions. The deflection directions are substantially orthogonal to the pupil splitting direction.

As shown in FIG. 23B, a luminous flux (first luminous flux) 1a passing through the split pupil 641a forms an AF image (hereinafter also referred to an image A) on an upper portion of an image-pickup element 6. A luminous flux (second luminous flux) 1b passing through the split pupil 641b forms an AF image (hereinafter also referred to an image B) on a lower portion of the image-pickup element 6.

Figure 25A:
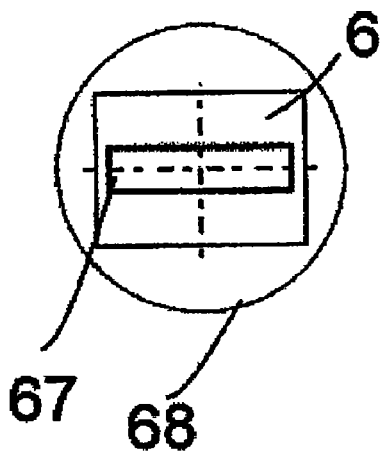
FIGS. 25A and 25B are diagrams for explaining image circles and AF image detection areas in Embodiment 7.
Figure 25B:
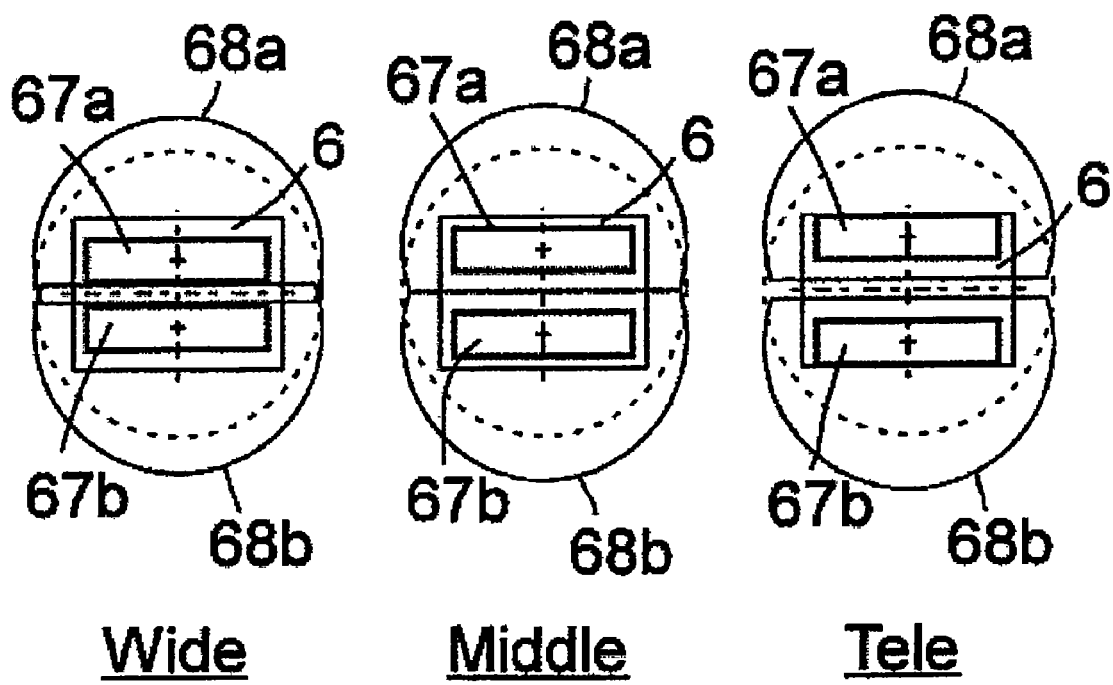

FIG. 25A shows an image circle 68 and an AF image detection area 67 on the image-pickup element 6 when the apparatus picks up an image and the light deflection unit 640 is not inserted into the optical path as shown in FIG. 23A. FIG. 25B shows image circles 68a and 68b and AF image detection areas 67a and 67b for two AF images at the wide-angle end, middle, and telephoto end when the apparatus performs AF and the light deflection unit 640 is inserted into the optical path as shown in FIG. 23B.

Figures 27A, 27B:
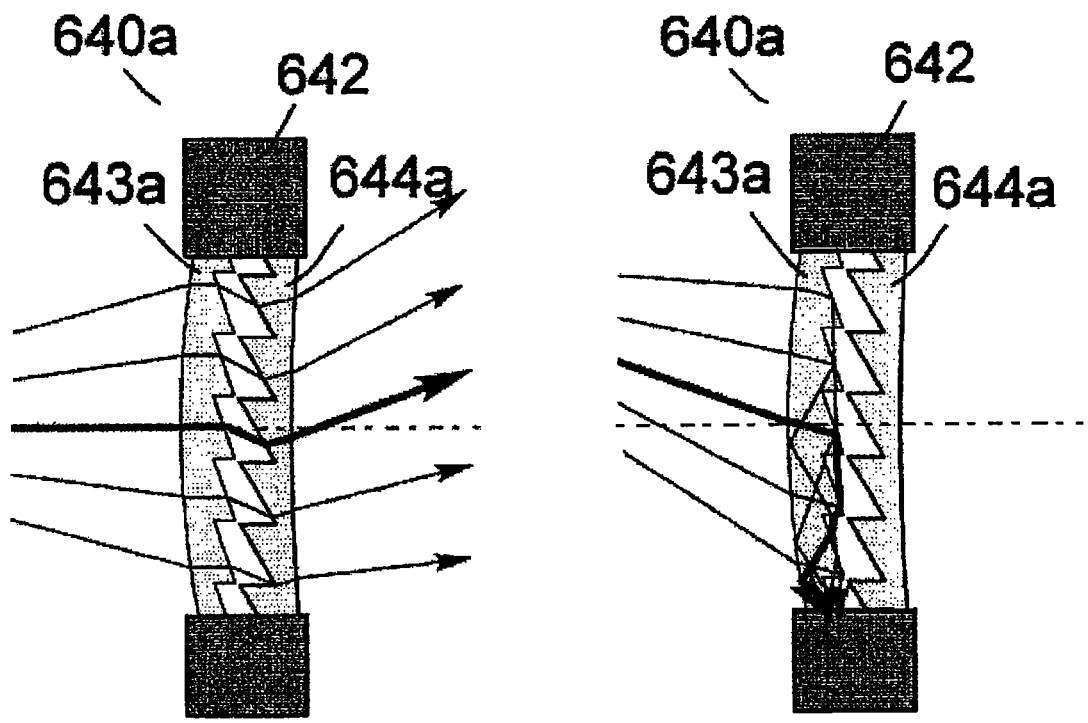
FIGS. 27A and 27B are diagrams for explaining transmitted light rays in the light deflection unit of Embodiment 7.

As shown in FIG. 25B, the image circle (area for forming the image A) 68a formed by the luminous flux passing through the split pupil 641a has a shape with a lower portion removed by the function of the light-limiting element 643a shown in FIGS. 27A and 27B to limit the luminous flux angle. The combined deflection effects of the light-limiting element 643a and the deflection optical element 644a deflect the luminous flux passing through the split pupil 641a to move the image circle 68a to an upper portion of the image-pickup element 6.

On the other hand, the image circle (area for forming the image B) 68b formed by the luminous flux passing through the split pupil 641b has a shape provided by rotating the image circle 68a by 180 degrees about the optical axis.

Adjusting the limited incident angle and the luminous flux deflection angle of the light deflection unit 640 enables to form the images A and B with no overlap in the AF image detection areas 67a and 67b on the image-pickup element 6.

Next, luminous fluxes in the image-pickup optical system 210 of Embodiment 7 will be described with reference to FIG. 26. Reference numeral 1g shows a luminous flux at the central image height and reference numeral 1h shows a luminous flux at an image height other than the central image height. As seen from FIG. 26, the luminous fluxes between the second and third lenses of the image-pickup optical system 210 are not collimated. Inserting the light deflection unit 640 in the vicinity of the pupil position enables to selectively set the transmitted image height and the blocked image height regardless of the incident position of the luminous flux.

Figure 26:
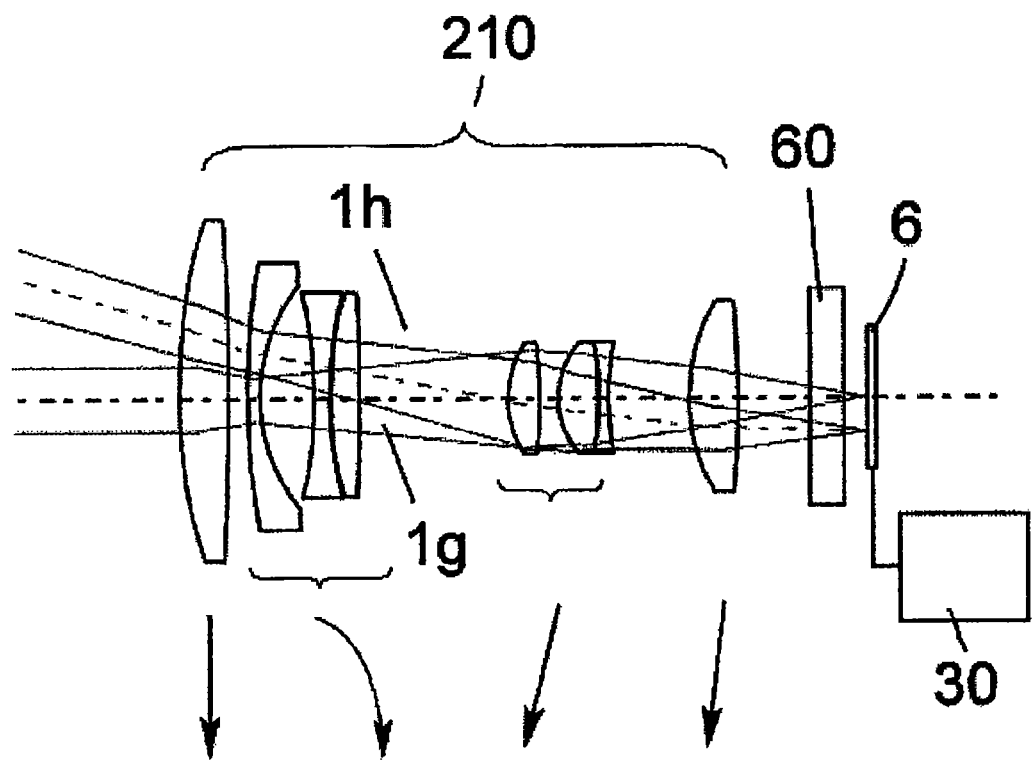
FIG. 26 is a diagram for explaining light rays through an image-pickup optical system in Embodiment 7.

FIGS. 27A and 27B show light rays when the light deflection unit 640a of Embodiment 7 is inserted between the second and third lenses of the image-pickup optical system 210 shown in FIG. 26. A light deflection unit 640a shown in FIGS. 27A and 27B is formed of a light-limiting element 643a and a deflection optical element 644a disposed at one of the two split pupils of the light deflection unit 640.

Each of the light-limiting element 643 and the deflection optical element 644a has a surface with a curvature and a prism-shaped portion on the surface opposite to the curved surface. FIG. 27A shows the luminous flux 1g at the central image height, while FIG. 27B shows the luminous flux 1h at an image height other than the central image height.

An entrance surface (first surface) of the light-limiting element 643a is formed as a curved surface having a positive optical power such that the diverging luminous flux (light rays) incident thereon is once collimated in the light-limiting element 643a. Since all the light rays are collimated by the first surface of the light-limiting element 643a, all the light rays impinge on the oblique surfaces of the prism-shaped portion of an emergence surface (second surface) having the light-limiting function at an angle in parallel with the optical axis in FIG. 27A. In FIG. 27B, all the light rays impinge on the oblique surfaces at an angle which satisfies the total reflection condition.

In FIG. 27A, all the light rays are desirably transmitted at a predetermined angle. As seen from FIG. 27A, most of the light rays are transmitted through the light deflection unit 640a at a desirable angle regardless of the incident positions of the light rays. For this reason, the structure can be realized with favorable use efficiency of light. On the other hand, in FIG. 27B, all the light rays are desirably blocked. As seen from FIG. 27B, most of the light rays are blocked by the light-limiting element 640a. Thus, the structure can be realized with reduced ghost light.

An emergence surface of the deflection optical element 644a has a curvature which changes the incident luminous flux into the original diverging luminous flux, that is, which cancels the optical power of the first surface of the light-limiting element 643a. As a result, the individual light rays can be deflected at substantially the same angles to realize the stable deflection function while the reliable light-limiting function is provided.

In this manner, the image-pickup optical system 210 of Embodiment 7 can prevent degraded AF images having a phase difference.

As described above, the light-limiting element forming part of the light deflection unit has the first surface having the optical power and the second surface having the blazed shape element formed thereon to allow stable AF performance in various image-pickup optical systems regardless of the position where the light deflection unit is inserted. In addition, the light deflection unit imposes fewer limitations on design in terms of space and the like to increase the flexibility in design.

While each of Embodiments 1 to 7 has been described in conjunction with the camera integral with the lens, the present invention is applicable to a single-lens reflex camera with an interchangeable lens. In this case, the light deflection unit is placed within the interchangeable lens.

In each of Embodiments 1 to 7, the pupil splitting is made in the horizontal direction to form the two AF images in the upper and lower portions of the image-pickup element. However, the pupil splitting may be made in the horizontal and vertical directions to form four or more AF images.

While each of Embodiments 1 to 7 has been described in the example of the light deflection unit using one or two prism sheets, three or more prism sheets may be used to form the light deflection unit. The optical apparatus of any structure having the light deflection unit with the function of limiting the luminous flux angle is included in embodiments of the present invention.

Embodiments 1 to 7 described above disclose the following:

(1) the deflection direction of the luminous flux by the light deflection unit is substantially orthogonal to the pupil splitting direction;

(2) the photoelectrical conversion element is the image-pickup element 6 for picking up an object image;

(3) the focus detection means (controller 30) produces single image information based on the output from the plurality of pixel lines in the photoelectrical conversion element and detects the focus state based on the image information; and (4) the photoelectrical conversion element has the color filters and detects the focus state for each of the pixels having the color filters of different colors.

As described above, according to Embodiments 1 to 7, at least one of the first and second luminous fluxes provided through the pupil splitting can be deflected by the deflection optical element in the direction different from the pupil splitting direction to form the AF images with substantially reduced aberration in the different areas on the photoelectrical conversion element. The 'at least one' means that the deflection optical element may be provided for only one of the first and second luminous fluxes. In addition, the combination of the light-limiting element and the deflection optical element can reliably avoid an overlap of the AF images which reduces the focus detection performance (that is, substantially separate the AF images). Consequently, excellent focus detection performance can be achieved even with the compact structure. Furthermore, ensuring the limit of light by substantially collimating the light rays allows the light deflection unit to be applied to various optical systems and to be inserted into the optical systems at positions determined with greatly increased flexibility.

Furthermore, the present invention is not limited to these preferred embodiments and various variations and modifications may be made without departing from the scope of the present invention.

This application claims foreign priority benefits based on Japanese Patent Applications Nos. 2005-321809, filed on Nov. 7, 2005, and 2006-157122, filed on Jun. 6, 2006, and each of which is hereby incorporated by reference herein in its entirety as if fully set forth herein.

What is claimed is:

1. An optical apparatus comprising:
a light deflection unit including a deflection optical member which deflects at least one of a first luminous flux and a second luminous flux relative to the other, the first and second luminous fluxes passing through a first area and a second area in the exit pupil of an optical system, respectively, and forming images on a photoelectrical conversion element,
wherein the light deflection unit comprises a light-limiting member which limits an image-forming area where at least one of the first and second luminous fluxes emerging from the light deflection unit forms the image on the photoelectrical conversion element,
wherein the light-limiting member is formed of an entrance-side member placed on the side of an entrance surface of the deflection optical member and an emergence-side member placed on the side of an emergence surface of the deflection optical member, and
wherein each of the entrance-side member and the emergence-side member has alternate areas for transmitting a luminous flux and areas for blocking the luminous flux, and the areas of the entrance-side member have a different phase from that of the areas of the emergence-side member.

2. An optical apparatus comprising:
a light deflection unit including a deflection optical member which deflects at least one of a first luminous flux and a second luminous flux relative to the other, the first and second luminous fluxes passing through a first area and a second area in an exit pupil of an optical system, respectively, and forming images on a photoelectrical conversion element,
wherein the light deflection unit comprises a light-limiting member which limits an image-forming area where at least one of the first and second luminous fluxes emerging from the light deflection unit forms the image on the photoelectrical conversion element,
wherein the light-limiting member has a first surface formed of a curved surface having an optical power and a second surface having a blazed shape element formed thereon, and
wherein the deflection optical member includes a surface having an optical power which cancels the optical power of the first surface of the light-limiting member.

* * * * *